(12) United States Patent
Fukazawa et al.

(10) Patent No.: US 11,479,081 B2
(45) Date of Patent: Oct. 25, 2022

(54) VEHICLE AIR CONDITIONING APPARATUS

(71) Applicant: TOYOTA JIDOSHA KABUSHIKI KAISHA, Aichi (JP)

(72) Inventors: Kazuhiro Fukazawa, Miyoshi (JP); Michio Ikeda, Nagoya (JP); Kenta Miyahara, Toyota (JP); Masaru Ando, Seto (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 261 days.

(21) Appl. No.: 16/854,918

(22) Filed: Apr. 22, 2020

(65) Prior Publication Data
US 2021/0053419 A1 Feb. 25, 2021

(30) Foreign Application Priority Data

Aug. 23, 2019 (JP) .............................. JP2019-152784

(51) Int. Cl.
*B61D 27/00* (2006.01)
*B63J 2/00* (2006.01)
*B60H 1/00* (2006.01)

(52) U.S. Cl.
CPC ..... *B60H 1/00742* (2013.01); *B60H 1/00278* (2013.01); *B60H 1/00321* (2013.01); *B60H 1/00821* (2013.01); *B60H 1/00878* (2013.01)

(58) Field of Classification Search
CPC ............ B60H 1/00742; B60H 1/00278; B60H 1/00321; B60H 1/00821; B60H 1/00878
USPC ......................................................... 454/75
See application file for complete search history.

(56) References Cited

U.S. PATENT DOCUMENTS

| 5,505,251 A * | 4/1996 | Sarbach ................... B60H 1/03 |
| | | 219/202 |
| 2008/0163670 A1* | 7/2008 | Georgeson ............. G08B 31/00 |
| | | 73/23.31 |
| 2015/0041553 A1 | 2/2015 | Taniguchi et al. |
| 2017/0330044 A1* | 11/2017 | Telpaz ................. G05D 1/0088 |

FOREIGN PATENT DOCUMENTS

| JP | 2003165328 A | 6/2003 |
| JP | 2004189178 A | 7/2004 |
| JP | 2006-298326 A | 11/2006 |
| JP | 2009190567 A | 8/2009 |
| JP | 2012218466 A | 11/2012 |

(Continued)

*Primary Examiner* — Davis D Hwu
(74) *Attorney, Agent, or Firm* — Hauptman Ham, LLP

(57) ABSTRACT

The vehicle air conditioning apparatus comprises at least one physical condition information sensor which detects information on physical conditions of passengers in a vehicle as physical condition information. The vehicle air conditioning apparatus selectively executes an outside-air circulation control for discharging air from an interior of the vehicle to outside of the vehicle and introducing outside air to the interior of the vehicle from the outside of the vehicle and an interior-air circulation control for taking the air from the interior of the vehicle and returning the taken air to the interior of the vehicle. The vehicle air conditioning apparatus executes the outside-air circulation control when the electronic control unit determines that at least one of the passengers has an infection, based on the physical condition information.

14 Claims, 14 Drawing Sheets

(56) References Cited

FOREIGN PATENT DOCUMENTS

| JP | 2013119355 A | 6/2013 |
| JP | 2013230702 A | 11/2013 |
| JP | 2019104312 A | 6/2019 |

* cited by examiner

VEHICLE AIR CONDITIONING APPARATUS

RELATED APPLICATIONS

The present application claims priority to Japanese Patent Application No. 2019-152784, filed Aug. 23, 2019, the disclosure of which is hereby incorporated by reference herein in its entirety.

BACKGROUND

Field

The invention relates to a vehicle air conditioning apparatus.

Description of the Related Art

A vehicle air conditioning apparatus is described in JP 2006-298326 A for heating an interior of a vehicle. The conventional vehicle air conditioning apparatus is configured to execute an outside air circulation control. The outside air circulation control is a control to (i) take air from outside of the vehicle, (ii) heat the taken air, (iii) supply the heated air to the interior of the vehicle, thereby heating the interior of the vehicle, and (iv) discharge the air to the outside of the vehicle from the interior of the vehicle. The conventional vehicle air conditioning apparatus is also configured to execute an interior air circulation control. The interior air circulation control is a control to (i) take the air from the interior of the vehicle, (ii) heat the taken air, (iii) return the heated air to the interior of the vehicle, thereby heating the interior of the vehicle.

When a temperature of the air in the interior of the vehicle is higher than a temperature of the air outside of the vehicle, the conventional vehicle air conditioning apparatus executes the outside air circulation control to heat the interior of the vehicle. On the other hand, when the temperature of the air in the interior of the vehicle is lower than or equal to the temperature of the air outside of the vehicle, the conventional vehicle air conditioning apparatus executes the interior air circulation control to heat the interior of the vehicle.

If the interior of the vehicle is heated by the interior-air circulation control when at least one of passengers including a driver of the vehicle has an infection such as a cold, infection sources are circulated in the interior of the vehicle. If any of the passengers does not have an infection when at least one of the passengers has an infection, the passengers not infected may catch infections. This is generally true of a case of circulating the air in the interior of the vehicle as well as a case of heating the interior of the vehicle.

SUMMARY

The invention has been made for solving the problems described above. An object of the invention is to provide a vehicle air conditioning apparatus which can prevent the passengers of the vehicle not infected from catching infections due to the infected passengers.

A vehicle air conditioning apparatus according to the invention comprises at least one physical condition information sensor and an electronic control unit.

The at least one physical condition information sensor detects information on physical conditions of passengers in a vehicle as physical condition information.

The electronic control unit is configured to selectively execute (i) an outside-air circulation control for discharging air from an interior of the vehicle to outside of the vehicle and introducing outside air to the interior of the vehicle from the outside of the vehicle and (ii) an interior-air circulation control for taking the air from the interior of the vehicle and returning the taken air to the interior of the vehicle.

The electronic control unit executes the outside-air circulation control when the electronic control unit determines that at least one of the passengers has an infection, based on the physical condition information.

Thereby, when at least one of the passengers has an infection, the air in the interior of the vehicle is discharged to the outside of the vehicle. Thus, pathogens are also discharged to the outside of the vehicle from the interior of the vehicle. Then, the fresh outside air is introduced into the interior of the vehicle from the outside of the vehicle. Thus, the passengers not infected can be prevented from catching infections.

According to an aspect of the invention, the vehicle air conditioning apparatus may further comprise taking openings for taking the air from the interior of the vehicle. In this case, when the electronic control unit determines that at least one of the passengers has an infection, the electronic control unit may execute the outside-air circulation control to (i) take the air from the interior of the vehicle via one or more of the taking openings provided nearest the infected passenger and (ii) discharge the taken air to the outside of the vehicle.

Thereby, the air around the infected passengers is discharged to the outside of the vehicle. Thus, the passengers not infected can be prevented from catching infections with certainty.

According to another aspect of the invention, the at least one physical condition information sensor may include at least one temperature sensor which detects skin temperatures of the passengers as passenger skin temperatures. In this case, the electronic control unit may determine that the passenger having a body temperature higher than or equal to a predetermined body temperature is an infected passenger, based on the passenger skin temperatures detected by the at least one temperature sensor.

According to further another aspect of the invention, the at least one physical condition information sensor may include at least one camera which takes images of the passengers. In this case, the electronic control unit may determine that the passenger making predetermined biological reaction is an infected passenger, based on the images of the passengers taken by the at least one camera.

According to further another aspect of the invention, the at least one physical condition information sensor may include at least one microphone which detects sound in the interior of the vehicle. In this case, the electronic control unit may determine that the passenger making predetermined biological reaction is an infected passenger, based on the sound detected by the at least one microphone.

According to further another aspect of the invention, the vehicle may be installed with a battery. The electronic control unit may be configured to execute the outside-air circulation control to (i) supply the air taken from the interior of the vehicle to the battery and (ii) discharge the air supplied to the battery to the outside of the vehicle when (i) the battery is requested to be warmed up, and (ii) a temperature of the air in the interior of the vehicle is higher than a temperature of the battery.

Thereby, the battery can be warmed up by the air discharged to the outside of the vehicle from the interior of the vehicle.

According to further another aspect of the invention, the vehicle may be installed with a battery. In this case, the electronic control unit may be configured to execute the outside-air circulation control to (i) supply the air taken from the interior of the vehicle to the battery and (ii) discharge the air supplied to the battery to the outside of the vehicle when (i) the battery is requested to be cooled, and (ii) a temperature of the air in the interior of the vehicle is lower than a temperature of the battery.

Thereby, the battery can be warmed up by the air discharged to the outside of the vehicle from the interior of the vehicle.

According to further another aspect of the invention, the vehicle air conditioning apparatus may further comprise a heating apparatus and a heat exchanger. The heating apparatus heats the outside air to be introduced into the interior of the vehicle from the outside of the vehicle by the outside-air circulation control. The heat exchanger is provided upstream of the heating apparatus and exchanges heat between (i) the air to be discharged to the outside of the vehicle from the interior of the vehicle by the outside-air circulation control and (ii) the air to be introduced into the interior of the vehicle from the outside of the vehicle by the outside-air circulation control.

Thereby, the outside air to be introduced into the interior of the vehicle is heated by the air discharged to the outside of the vehicle from the interior of the vehicle when (i) the interior of the vehicle is being heated by the heating apparatus, and (ii) a temperature of the air in the interior of the vehicle is higher than a temperature of the outside air. Thus, an efficiency of heating the interior of the vehicle can be improved.

According to further another aspect of the invention, the vehicle air conditioning apparatus may further comprise a temperature setting dial which sets a target of a temperature of the interior of the vehicle. In this case, the electronic control unit may execute the outside-air circulation control with controlling operations of the heating apparatus to introduce the outside air having a temperature corresponding to the target set by the temperature setting dial, to the interior of the vehicle.

According to further another aspect of the invention, the vehicle air conditioning apparatus may further comprise a cooling apparatus and a heat exchanger. The cooling apparatus which cools the outside air to be introduced into the interior of the vehicle from the outside of the vehicle by the outside-air circulation control. The heat exchanger which is provided upstream of the cooling apparatus and exchanges heat between (i) the air to be discharged to the outside of the vehicle from the interior of the vehicle by the outside-air circulation control and (ii) the air to be introduced into the interior of the vehicle from the outside of the vehicle by the outside-air circulation control.

Thereby, the outside air to be introduced into the interior of the vehicle is cooled by the air discharged to the outside of the vehicle from the interior of the vehicle when (i) the interior of the vehicle is being cooled by the cooling apparatus, and (ii) the temperature of the air in the interior of the vehicle is lower than the temperature of the outside air. Thus, an efficiency of cooling the interior of the vehicle can be improved.

According to further another aspect of the invention, the vehicle air conditioning apparatus may further comprise a temperature setting dial which sets a target of a temperature of the interior of the vehicle. In this case, the electronic control unit may execute the outside-air circulation control with controlling operations of the cooling apparatus to introduce the outside air having a temperature corresponding to the target set by the temperature setting dial, to the interior of the vehicle.

According to further another aspect of the invention, the electronic control unit may be configured to execute the interior-air circulation control without executing the outside-air circulation control in response to the passenger requesting to execute the interior-air circulation control even when the electronic control unit determines that at least one of the passengers has an infection.

Thereby, the outside-air circulation control is executed only when the passenger does not request to execute the interior-air circulation control. Thus, the outside-air circulation control is not executed against a request of the passenger.

According to further another aspect of the invention, the electronic control unit may be configured to notice the passengers that the outside-air circulation control is executed when the electronic control unit executes the outside-air circulation control in response to determining that at least one of the passengers has an infection.

Thereby, the passenger can be promoted to request to execute the interior-air circulation control when the passenger does not desire executing the outside-air circulation control.

According to further another aspect of the invention, the vehicle air conditioning apparatus may further comprise a display device which displays an image noticing that the outside-air circulation control is executed.

According to further another aspect of the invention, a driver of the vehicle may be one of the passengers.

Elements of the invention are not limited to elements of embodiments and modified examples of the invention described along with the drawings. The other objects, features and accompanied advantages of the invention can be easily understood from the embodiments and the modified examples of the invention.

DESCRIPTION OF THE PREFERRED EMBODIMENTS

Figure 1:
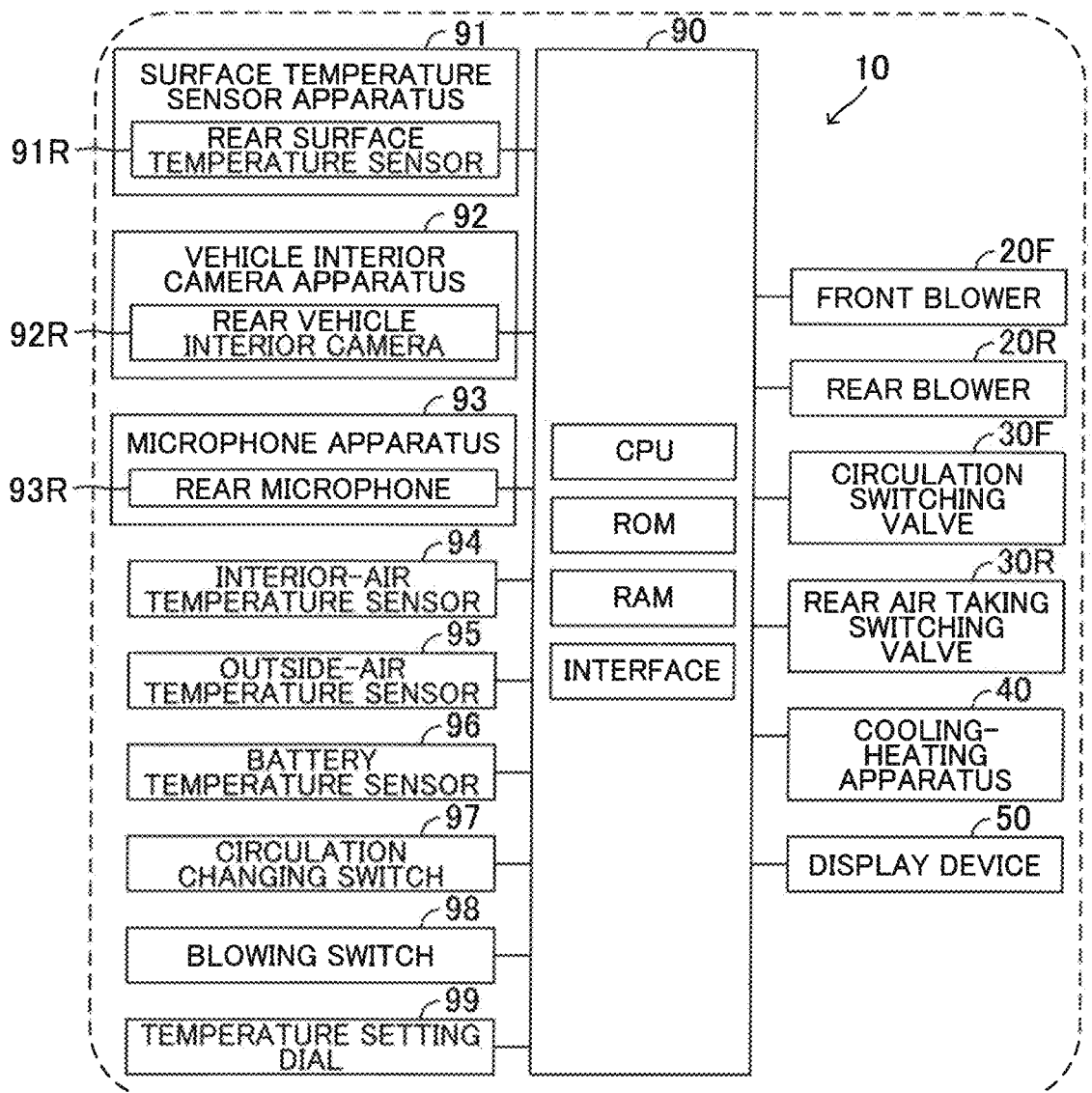
FIG. 1 is a view which shows a vehicle air conditioning apparatus according to an embodiment of the invention and a vehicle to which the vehicle air conditioning apparatus is applied.

Below, a vehicle air conditioning apparatus according to an embodiment of the invention will be described with reference to the drawings. FIG. 1 shows the vehicle air conditioning apparatus 10 according to the embodiment of the invention and a vehicle 100 to which the vehicle air conditioning apparatus 10 is applied.

Figure 2:
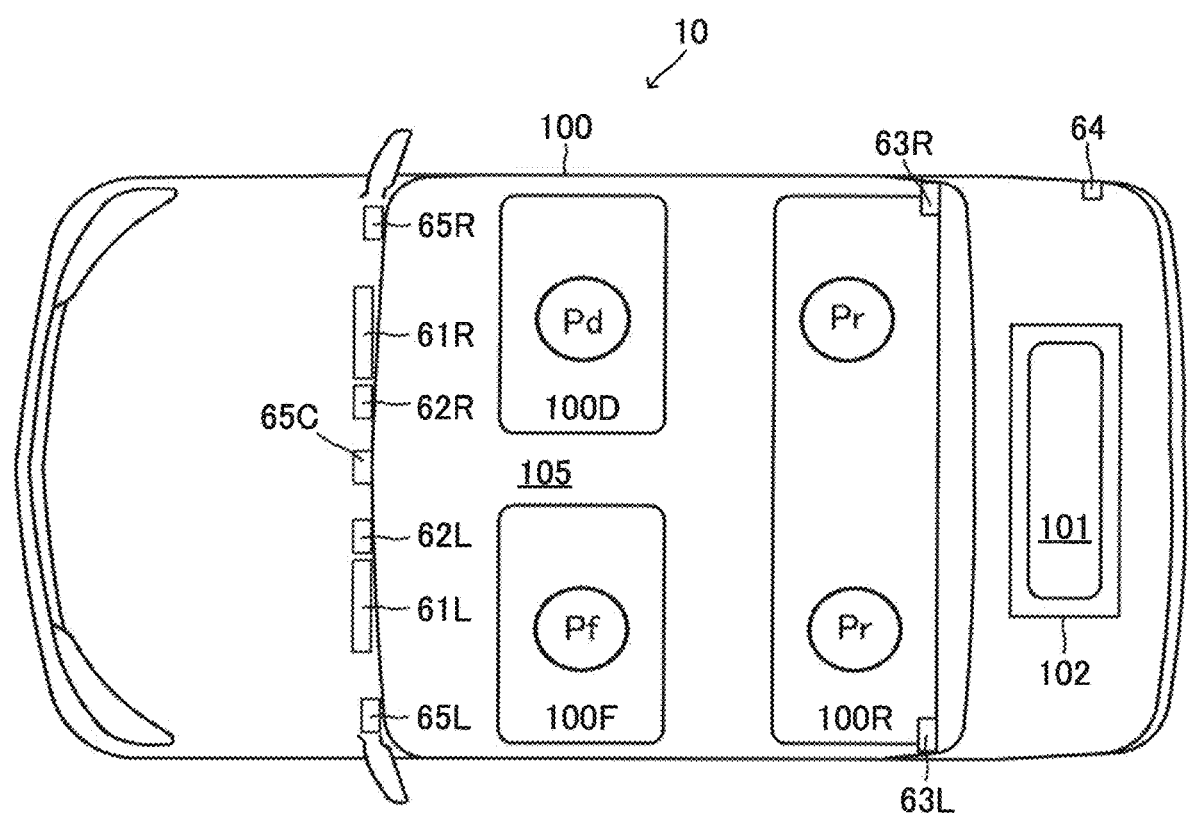
FIG. 2 is a top view which shows the vehicle to which the vehicle air conditioning apparatus according to the embodiment of the invention is applied.

In this embodiment, the vehicle 100 is a so-called plug-in hybrid vehicle (PHV) equipped with an internal combustion engine (not shown), at least one motor generator (not shown), and a battery 101 (see FIG. 2). The battery 101 is housed in a battery case 102. The battery 101 is cooled by cooling water. The vehicle 100 is driven by power output from the internal combustion engine and power output from the motor generator. When the battery 101 supplies electricity to the motor generator, the motor generator operates as an electric motor to output the power to the vehicle 100. When the motor generator is rotated by (i) external energy such as moving energy of the vehicle 100 and/or (ii) the power output from the internal combustion engine, the motor generator generates the electricity. The battery 101 can store the electricity generated by the motor generator. The battery 101 can be charged with the electricity from external power source.

As shown in FIG. 1, the vehicle air conditioning apparatus 10 includes a front blower 20F, a rear blower 20R, a circulation switching valve 30F, a rear air taking switching valve 30R, a cooling-heating apparatus 40, a display device 50, and an ECU 90.

ECU stands for electronic control unit. The ECU 90 includes a microcomputer as a main component. The microcomputer includes a CPU, a ROM, a RAM, a non-volatile memory, and an interface. The CPU realizes various functions by executing instructions, programs, or routines memorized in the ROM.

As shown in FIG. 2, the vehicle air conditioning apparatus 10 further includes a right outside-air taking opening 61R, a left outside-air taking opening 61L, a right front interior-air taking opening 62R, a left front interior-air taking opening 62L, a right rear interior-air taking opening 63R, a left rear interior-air taking opening 63L, an interior-air discharging opening 64, a center air introducing opening 65C, a right air introducing opening 65R, and a left air introducing opening 65L.

The right outside-air taking opening 61R is an opening for taking outside air. The right outside-air taking opening 61R is provided in front of a driver's seat 100D at a right side of a center position of the vehicle 100 in a width 100W of the vehicle 100 in a width direction DW of the vehicle 100. Hereinafter, the width 100W will be referred to as "the vehicle width 100W", and the width direction DW will be referred to as "the vehicle width direction DW" The right outside-air taking opening 61R is exposed to an outside of the vehicle 100.

The left outside-air taking opening 61L is an opening for taking the outside air. The left outside-air taking opening 61L is provided in front of a front passenger's seat 100F at a left side of the center position of the vehicle 100 in the vehicle width 100W in the vehicle width direction DW. The left outside-air taking opening 61L is exposed to the outside of the vehicle 100.

The right front interior-air taking opening 62R is an opening for taking air from a vehicle interior 105. The right front interior-air taking opening 62R is provided in front of the driver's seat 100D at the right side of the center position of the vehicle 100 in the vehicle width 100W in the vehicle width direction DW. The right front interior-air taking opening 62R is exposed to the vehicle interior 105.

The left front interior-air taking opening 62L is an opening for taking air from the vehicle interior 105. The left front interior-air taking opening 62L is provided in front of the front passenger's seat 100F at the left side of the center position of the vehicle 100 in the vehicle width 100W in the vehicle width direction DW. The left front interior-air taking opening 62L is exposed to the vehicle interior 105.

The right rear interior-air taking opening 63R is an opening for taking the air from the vehicle interior 105. The right rear interior-air taking opening 63R is provided next to a portion of the vehicle 100 at a rearward-right side of a rear passenger's seat 100R (e.g. a C-pillar). The right rear interior-air taking opening 63R is exposed to the vehicle interior 105.

The left rear interior-air taking opening 63L is an opening for taking the air from the vehicle interior 105. The left rear interior-air taking opening 63L is provided next to a portion of the vehicle 100 at a rearward-left side of the rear passenger's seat 100R (e.g. a C-pillar). The left rear interior-air taking opening 63L is exposed to the vehicle interior 105.

The interior-air discharging opening 64 is an opening for discharging the air from the vehicle interior 105 to the outside of the vehicle 100. The interior-air discharging opening 64 is provided at a right rear portion of the vehicle 100. The interior-air discharging opening 64 is exposed to the outside of the vehicle 100.

The center air introducing opening 65C is an opening for introducing the air into the vehicle interior 105. The center air introducing opening 65C is provided in front of the driver's seat 100D and the front passenger's seat 100F at the center position of the vehicle 100 in the vehicle width 100W in the vehicle width direction DW. The center air introducing opening 65C is exposed to the vehicle interior 105.

The right air introducing opening 65R is an opening for introducing the air into the vehicle interior 105. The right air introducing opening 65R is provided at a forward-right side of the driver's seat 100D. The right air introducing opening 65R is exposed to the vehicle interior 105.

The left air introducing opening 65L is an opening for introducing the air into the vehicle interior 105. The left air introducing opening 65L is provided at a forward-left side of the front passenger's seat 100F. The left air introducing opening 65L is exposed to the vehicle interior 105.

Figure 3:
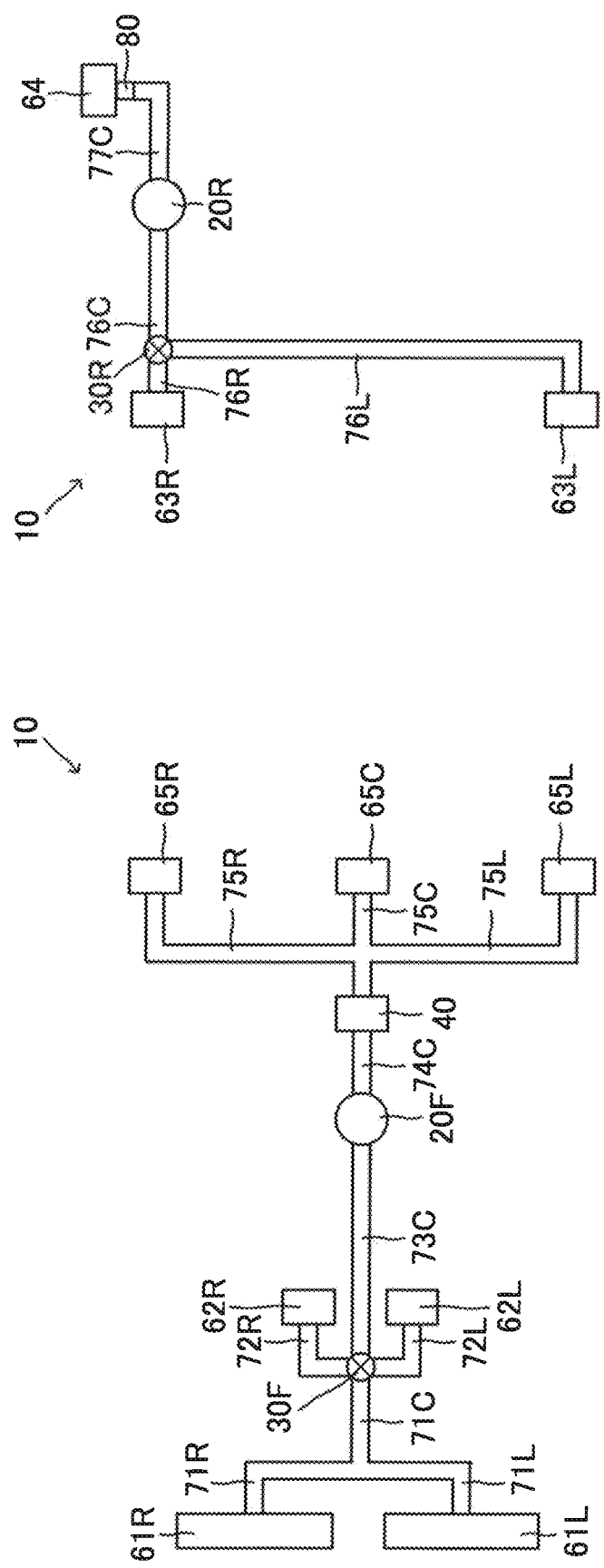
FIG. 3 is a general view which shows the vehicle air conditioning apparatus according to the embodiment of the invention.

As shown in FIG. 3, the right outside-air taking opening 61R is fluidically connected to the circulation switching valve 30F via a right outside-air taking duct 71R and a common outside-air taking duct 71C. The left outside-air taking opening 61L is fluidically connected to the circulation switching valve 30F via a left outside-air taking duct 71L and the common outside-air taking duct 71C.

The right front interior-air taking opening 62R is fluidically connected to the circulation switching valve 30F via a right front interior-air taking duct 72R. The left front interior-air taking opening 62L is fluidically connected to the circulation switching valve 30F via a left front interior-air taking duct 72L.

The circulation switching valve 30F is fluidically connected to the front blower 20F via a common air taking duct 73C.

The front blower 20F is fluidically connected to the right air introducing opening 65R via a common air introducing duct 74C and a right air introducing duct 75R. Also, the front blower 20F is fluidically connected to the center air introducing opening 65C via the common air introducing duct 74C and a center air introducing duct 75C. Also, the front blower 20F is fluidically connected to the left air introducing opening 65L via the common air introducing duct 74C and a left air introducing duct 75L.

The cooling-heating apparatus 40 is provided in the common air introducing duct 74C. The cooling-heating apparatus 40 cools and heats the air flowing in the common air introducing duct 74C.

The right rear interior-air taking opening 63R is fluidically connected to the rear air taking switching valve 30R via a right rear interior-air taking duct 76R. The left rear interior-air taking opening 63L is fluidically connected to the rear air taking switching valve 30R via a left rear interior-air taking duct 76L. The rear air taking switching valve 30R is fluidically connected to the rear blower 20R via a rear common interior-air taking duct 76C. The rear blower 20R is fluidically connected to the interior-air discharging opening 64 via a common interior-air discharging duct 77C. A filter 80 is provided in the common interior-air discharging duct 77C.

When (i) the front blower 20F is operated, and (ii) an operation position of the circulation switching valve 30F is set at an interior-air circulation position, the air in the vehicle interior 105 is taken into the front blower 20F from the right front interior-air taking opening 62R via the right front interior-air taking duct 72R, the circulation switching valve 30F, and the common air taking duct 73C. Also, the air in the vehicle interior 105 is taken into the front blower 20F from the left front interior-air taking opening 62L via the left front interior-air taking duct 72L, the circulation switching valve 30F, and the common air taking duct 73C. The air taken into the front blower 20F is introduced into the vehicle interior 105 from the right air introducing opening 65R via the common air introducing duct 74C and the right air introducing duct 75R. Also, the air taken into the front blower 20F is introduced into the vehicle interior 105 from the center air introducing opening 65C via the common air introducing duct 74C and the center air introducing duct 75C. Also, the air taken into the front blower 20F is introduced into the vehicle interior 105 from the left air introducing opening 65L via the common air introducing duct 74C and the left air introducing duct 75L.

When (i) the front blower 20F is operated, and (ii) the operation position of the circulation switching valve 30F is set at an outside-air circulation position, the air outside of the vehicle 100 is taken into the front blower 20F from the right outside-air taking opening 61R via the right outside-air taking duct 71R, the common outside-air taking duct 71C, the circulation switching valve 30F, and the common air taking duct 73C. Also, the air outside of the vehicle 100 is taken into the front blower 20F from the left outside-air taking opening 61L, the left outside-air taking duct 71L, the common outside-air taking duct 71C, the circulation switching valve 30F, and the common air taking duct 73C. The air taken into the front blower 20F is introduced into the vehicle interior 105 from the right air introducing opening 65R via the common air introducing duct 74C and the right air introducing duct 75R. Also, the air taken into the front blower 20F is introduced into the vehicle interior 105 from the center air introducing opening 65C via the common air introducing duct 74C and the center air introducing duct 75C. Also, the air taken into the front blower 20F is introduced into the vehicle interior 105 from the left air introducing opening 65L via the common air introducing duct 74C and the left air introducing duct 75L.

When (i) the rear blower 20R is operated, and (ii) an operation position of the rear air taking switching valve 30R is set at a right air taking position, the air in the vehicle interior 105 is taken into the rear blower 20R from the right rear interior-air taking opening 63R via the right rear interior-air taking duct 76R, the rear air taking switching valve 30R, and the rear common interior-air taking duct 76C. The air taken into the rear blower 20R is discharged to the outside of the vehicle 100 from the interior-air discharging opening 64 via the common interior-air discharging duct 77C.

When (i) the rear blower 20R is operated, and (ii) the operation position of the rear air taking switching valve 30R is set at a left air taking position, the air in the vehicle interior 105 is taken into the rear blower 20R from the left rear interior-air taking opening 63L via the left rear interior-air taking duct 76L, the rear air taking switching valve 30R, and the rear common interior-air taking duct 76C. The air taken into the rear blower 20R is discharged to the outside of the vehicle 100 from the interior-air discharging opening 64 via the common interior-air discharging duct 77C.

When (i) the rear blower 20R is operated, and (ii) the operation position of the rear air taking switching valve 30R is set at a left-and-right air taking position, the air in the vehicle interior 105 is taken into the rear blower 20R from the right rear interior-air taking opening 63R via the right rear interior-air taking duct 76R, the rear air taking switching valve 30R, and the rear common interior-air taking duct 76C and from the left rear interior-air taking opening 63L via the left rear interior-air taking duct 76L, the rear air taking switching valve 30R, and the rear common interior-air taking duct 76C. The air taken into the rear blower 20R is discharged to the outside of the vehicle 100 from the interior-air discharging opening 64 via the common interior-air discharging duct 77C.

When the operation position of the rear air taking switching valve 30R is set at a shut-off position, the air in the vehicle interior 105 is not taken into the right rear interior-air taking duct 76R nor the left rear interior-air taking duct 76L.

The filter 80 is provided in the common interior-air discharging duct 77C. The filter 80 is formed of material which can trap pathogens such as virus in the air.

As shown in FIG. 1, the circulation switching valve 30F, the front blower 20F, the rear air taking switching valve 30R, and the rear blower 20R are electrically connected to the ECU 90. The ECU 90 can control an operation position of the circulation switching valve 30F. The ECU 90 can operate and stop the front blower 20F. The ECU 90 can control an operation position of the rear air taking switching valve 30R. The ECU 90 can operate and stop the rear blower 20R.

<Cooling-Heating Apparatus>

The cooling-heating apparatus 40 is electrically connected to the ECU 90. The ECU 90 can control operations of the cooling-heating apparatus 40 to cool and heat the air flowing in the common air introducing duct 74C.

<Display Device>

The display device 50 is provided at a portion of the vehicle 100 which a driver Pd and a front passenger Pf can see. As shown in FIG. 1, the display device 50 is electrically connected to the ECU 90. The ECU 90 can cause the display device 50 to display various images.

<Sensors>

As shown in FIG. 1, the vehicle air conditioning apparatus 10 includes a surface temperature sensor apparatus 91, a vehicle interior camera apparatus 92, a microphone apparatus 93, an interior-air temperature sensor 94, an outside-air temperature sensor 95, a battery temperature sensor 96, a circulation changing switch 97, a blowing switch 98, and a temperature setting dial 99.

<Surface Temperature Sensor Apparatus>

Figure 4:
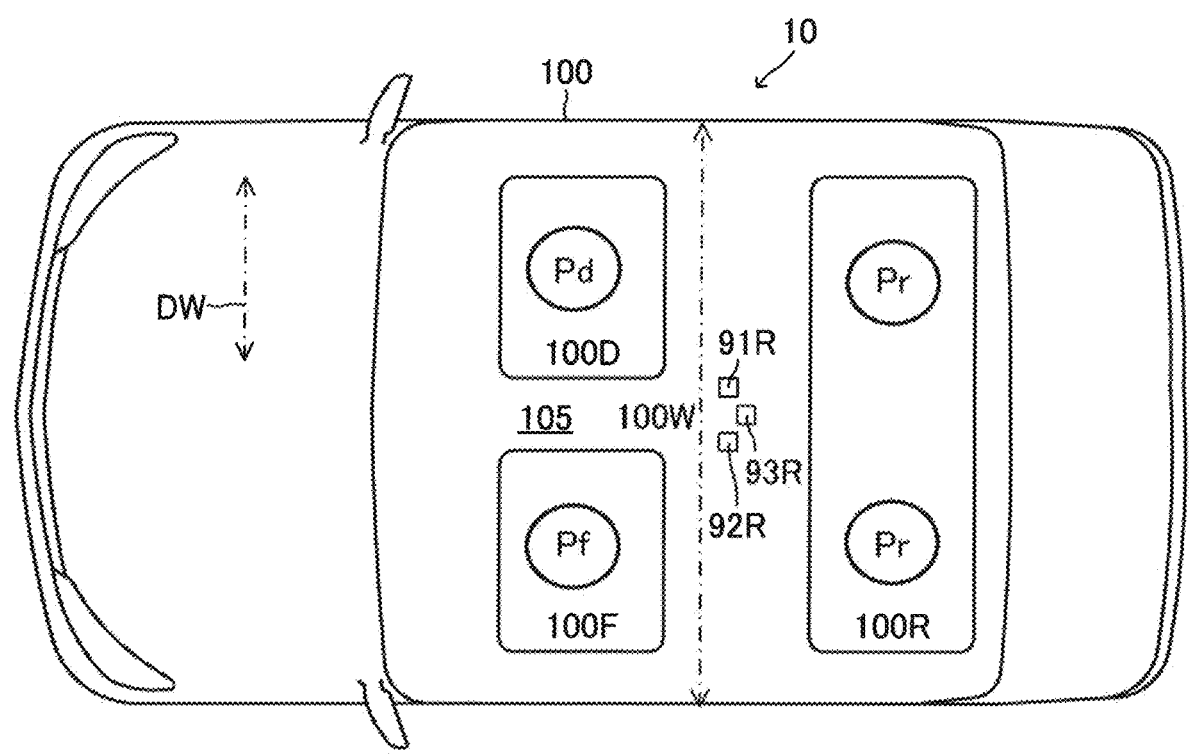
FIG. 4 is a top view which shows the vehicle to which the vehicle air conditioning apparatus according to the embodiment of the invention is applied.

The surface temperature sensor apparatus 91 includes a rear surface temperature sensor 91R. The rear surface temperature sensor 91R may detect infrared rays radiated from objects. The surface temperature sensor apparatus 91 is a thermography which detects a surface temperature of the object by analyzing the infrared rays detected by the rear surface temperature sensor 91R. The rear surface temperature sensor 91R is mounted on a ceiling 106 defining the vehicle interior 105 to detect skin temperatures Tr_face of faces of passengers Pr seated on the rear passenger's seat 100R. Hereinafter, the ceiling 106 defining the vehicle interior 105 will be referred to as "the vehicle interior ceiling 106.", and the passenger Pr seated on the rear passenger's seat 100R will be referred to as "the rear passenger Pr." As shown in FIG. 4, in this embodiment, the rear surface temperature sensor 91R is mounted on the vehicle interior ceiling 106 between the driver's seat 100D, the front passenger's seat 100F, and the rear passenger's seat 100R at the center position in the vehicle width 100W in the vehicle width direction DW.

As shown in FIG. 1, the rear surface temperature sensor 91R is electrically connected to the ECU 90. The rear surface temperature sensor 91R detects the skin temperatures Tr_face of the faces of the rear passengers Pr. The rear surface temperature sensor 91R sends signals Sr_temp representing the detected temperatures Tr_face to the ECU 90. Hereinafter, the signal Sr_temp will be referred to as "the rear temperature signal Sr_temp."

The ECU 90 acquires the skin temperatures Tr_face of the faces of the rear passengers Pr, based on the rear temperature signals Sr_temp. The ECU 90 estimates body temperatures Tr_body of the rear passengers Pr, based on the acquired skin temperatures Tr_face. The ECU 90 determines that at least one of the rear passengers Pr has an infection such as a cold when at least one of the estimated body temperatures Tr_body is higher than or equal to a predetermined body temperature Tbody_th (for example, 37 Celsius degrees). In this case, the ECU 90 also determines that pathogens such as bacteria and virus exist in the vehicle interior 105. The pathogens such as the bacteria and the virus may cause the infection in persons. Therefore, the pathogens such as the bacteria and the virus are infection sources.

<Vehicle Interior Camera Apparatus>

As shown in FIG. 1, the vehicle interior camera apparatus 92 includes a rear vehicle interior camera 92R. The rear vehicle interior camera 92R is mounted on the vehicle interior ceiling 106 to take images of the rear passengers Pr. As shown in FIG. 4, in this embodiment, the rear vehicle interior camera 92R is mounted on the vehicle interior ceiling 106 between the driver's seat 100D, the front passenger's seat 100F, and the rear passenger's seat 100R at the center position in the vehicle width 100W in the vehicle width direction DW.

The rear vehicle interior camera 92R is electrically connected to the ECU 90. The rear vehicle interior camera 92R takes an image of the vehicle interior 105 including the rear passengers Pr. The rear vehicle interior camera 92R sends data Dr_image on the taken image to the ECU 90. Hereinafter, the data Dr_image will be referred to as "the rear image data Dr_image."

The ECU 90 determines whether at least one of the rear passengers Pr has made biological reaction such as coughing and sneezing, based on the rear image data Dr_image. When the ECU 90 determines that at least one of the rear passengers Pr has made the biological reaction of a predetermined number of times Nth or more within a predetermined period of time Tth, the ECU 90 determines that the at least one of the rear passengers Pr has an infection such as a cold. In this case, the ECU 90 also determines that the pathogens such as the virus exist in the vehicle interior 105.

The predetermined period of time Tth may be set to a period of time suitable for accurately determining whether at least one of the rear passengers Pr has an infection such as a cold. The predetermined number of times Nth may be set to a number of times suitable for accurately determining whether at least one of the rear passengers Pr has an infection such as a cold. The predetermined number of times Nth may be one. In this case, the predetermined period of time Tth may be omitted.

In addition, the ECU 90 determines whether there is/are the rear passenger(s) Pr, based on the rear image data Dr_image.

<Microphone Apparatus>

As shown in FIG. 1, the microphone apparatus 93 includes a rear microphone 93R. The rear microphone 93R is mounted on the vehicle interior ceiling 106 to detect sound generated by the rear passengers Pr. As shown in FIG. 4, in this embodiment, the rear microphone 93R is mounted on the vehicle interior ceiling 106 between the driver's seat 100D, the front passenger's seat 100F, and the rear passenger's seat 100R at the center position in the vehicle width 100W in the vehicle width direction DW.

As shown in FIG. 1, the rear microphone 93R is electrically connected to the ECU 90. The rear microphone 93R detects the sound generated in the vehicle interior 105. The rear microphone 93R sends a signal Sr_sound representing the detected sound to the ECU 90. Hereinafter, the signal Sr_sound will be referred to as "the rear sound signal Sr_sound."

The ECU 90 determines whether at least one of the rear passengers Pr has made the biological reaction such as coughing and sneezing, based on the rear sound signal Sr_sound. When the ECU 90 determines that at least one of the rear passengers Pr has made the biological reaction of the predetermined number of times Nth or more within the predetermined period of time Tth, the ECU 90 determines that at least one of the rear passengers Pr has an infection such as a cold. In this case, the ECU 90 also determines that the pathogens such as the virus exist in the vehicle interior 105.

<Interior-Air Temperature Sensor>

The interior-air temperature sensor 94 is mounted on a portion of the vehicle 100 to detect a temperature Tin of the air in the vehicle interior 105. As shown in FIG. 1, the interior-air temperature sensor 94 is electrically connected to the ECU 90. The interior-air temperature sensor 94 detects the temperature Tin of the air in the vehicle interior 105. The interior-air temperature sensor 94 sends a signal representing the detected temperature Tin to the ECU 90. The ECU 90 acquires the temperature Tin of the air in the vehicle interior 105, based on the signal sent from the interior-air temperature sensor 94. Hereinafter, the temperature Tin of the air in the vehicle interior 105 will be referred to as "the interior-air temperature Tin."

<Outside-Air Temperature Sensor>

The outside-air temperature sensor 95 is mounted on a portion of the vehicle 100 to detect a temperature Tout of the outside air. As shown in FIG. 1, the outside-air temperature sensor 95 is electrically connected to the ECU 90. The outside-air temperature sensor 95 detects the temperature Tout of the outside air. The outside-air temperature sensor 95 sends a signal representing the detected temperature Tout to the ECU 90. The ECU 90 acquires the temperature Tout of the outside air, based on the signal sent from the outside-air temperature sensor 95. Hereinafter, the temperature Tout of the outside air will be referred to as "the outside-air temperature Tout."

<Battery Temperature Sensor>

The battery temperature sensor 96 is mounted at a portion of the vehicle 100 to detect a temperature Tbat of the battery 101. As shown in FIG. 1, the battery temperature sensor 96 is electrically connected to the ECU 90. The battery temperature sensor 96 detects the temperature Tbat of the battery 101 and sends a signal representing the detected temperature Tbat to the ECU 90. The ECU 90 acquires the temperature Tbat of the battery 101, based on the signal sent from the battery temperature sensor 96. Hereinafter, the temperature Tbat of the battery 101 will be referred to as "the battery temperature Tbat."

<Circulation Changing Switch>

The circulation changing switch 97 is mounted at a portion of the vehicle 100 to be operated by the driver Pd and the front passenger Pf. As shown in FIG. 1, the circulation changing switch 97 is electrically connected to the ECU 90. When the circulation changing switch 97 is set at an interior-air circulation request position, the circulation changing switch 97 sends an interior-air circulation request signal Sin to the ECU 90. On the other hand, when the circulation changing switch 97 is set at an outside-air circulation request position, the circulation changing switch 97 sends an outside-air circulation request signal Sout to the ECU 90.

The ECU 90 sets a value of an interior-air circulation request flag Xin to "1" when the ECU 90 receives the interior-air circulation request signal Sin. On the other hand, when the ECU 90 receives the outside-air circulation request signal Sout, the ECU 90 sets the value of the interior-air circulation request flag Xin to "0."

<Blowing Switch>

The blowing switch 98 is mounted at a portion of the vehicle 100 to be operated by the driver Pd and the front passenger Pf. As shown in FIG. 1, the blowing switch 98 is electrically connected to the ECU 90. When the blowing switch 98 is set at an ON position, the blowing switch 98 sends a blowing request signal Sair to the ECU 90. On the other hand, when the blowing switch 98 is set at an OFF position, the blowing switch 98 sends a blowing stop request signal Soff to the ECU 90.

The ECU 90 sets a value of a blowing request flag Xair to "1" when the ECU 90 receives the blowing request signal Sair. On the other hand, when the ECU 90 receives the blowing stop request signal Soff, the ECU 90 sets the value of the blowing request flag Xair to "0."

<Temperature Setting Dial>

The temperature setting dial 99 is mounted on a portion of the vehicle 100 to be operated by the driver Pd and the front passenger Pf. As shown in FIG. 1, the temperature setting dial 99 is electrically connected to the ECU 90. The temperature setting dial 99 sends a signal Stemp representing a temperature set by the driver Pd or the front passenger Pf operating the temperature setting dial 99 to the ECU 90. Hereinafter, the signal Stemp will be referred to as "the set temperature signal Stemp."

The ECU 90 acquires a temperature Tset set by the driver Pd or the front passenger Pf, based on the set temperature signal Stemp. Hereinafter, the temperature Tset will be referred to as "the set temperature Tset."

<Summary of Operations of Vehicle Air Conditioning Apparatus>

Next, a summary of operations of the vehicle air conditioning apparatus 10 will be described.

<Normal Interior-Air Circulation Control>

The vehicle air conditioning apparatus 10 starts to execute a normal interior-air circulation control when the vehicle air conditioning apparatus 10 receives (i) the blowing request signal Sair and (ii) the interior-air circulation request signal Sin. When the vehicle air conditioning apparatus 10 executes the normal interior-air circulation control, the vehicle air conditioning apparatus 10 (i) sets the operation position of the circulation switching valve 30F at the interior-air circulation position, (ii) sets the operation position of the rear air taking switching valve 30R at the shut-off position, (iii) operates the front blower 20F, and (iv) maintains the rear blower 20R stopped.

Thereby, the air in the vehicle interior 105 is taken into the right front interior-air taking duct 72R via the right front interior-air taking opening 62R and into the left front interior-air taking duct 72L via the left front interior-air taking opening 62L. The taken air flows through the circulation switching valve 30F, the common air taking duct 73C, the front blower 20F, the common air introducing duct 74C, the right air introducing duct 75R, the left air introducing duct 75L, and the center air introducing duct 75C. Then, the air is introduced into the vehicle interior 105 from the right air introducing opening 65R, the left air introducing opening 65L, and the center air introducing opening 65C.

When the vehicle air conditioning apparatus 10 executes the normal interior-air circulation control, the vehicle air conditioning apparatus 10 controls the operations of the cooling-heating apparatus 40 to introduce the air having the set temperature Tset acquired, based on the set temperature signal Stemp, into the vehicle interior 105 from the right air introducing opening 65R, the left air introducing opening 65L, and the center air introducing opening 65C.

<Normal Outside-Air Circulation Control>

On the other hand, when the vehicle air conditioning apparatus 10 receives (i) the blowing request signal Sair and (ii) the outside-air circulation request signal Sout, the vehicle air conditioning apparatus 10 starts to execute a normal outside-air circulation control. When the vehicle air conditioning apparatus 10 executes the normal outside-air circulation control, the vehicle air conditioning apparatus 10 (i) sets the operation position of the circulation switching valve 30F at the outside-air circulation position, (ii) sets the operation position of the rear air taking switching valve 30R at the left-and-right air taking position, and (iii) operates the front blower 20F and the rear blower 20R.

Thereby, the outside air is taken to the right outside-air taking duct 71R via the right outside-air taking opening 61R and is taken to the left outside-air taking duct 71L via the left outside-air taking opening 61L. The taken outside air flows through the common outside-air taking duct 71C, the circulation switching valve 30F, the common air taking duct 73C, the front blower 20F, the common air introducing duct 74C, the right air introducing duct 75R, the left air introducing duct 75L, and the center air introducing duct 75C. Then, the taken outside air is introduced into the vehicle interior 105 from the right air introducing opening 65R, the left air introducing opening 65L, and the center air introducing opening 65C.

When the vehicle air conditioning apparatus 10 executes the normal outside-air circulation control, the vehicle air conditioning apparatus 10 controls the operations of the cooling-heating apparatus 40 to introduce the air having the set temperature Tset acquired, based on the set temperature signal Stemp, into the vehicle interior 105 from the right air introducing opening 65R, the left air introducing opening 65L, and the center air introducing opening 65C.

<Active Outside-Air Circulation Control>

Further, the vehicle air conditioning apparatus 10 starts to execute an active outside-air circulation control when the vehicle air conditioning apparatus 10 determines that the pathogens such as the virus exist in the vehicle interior 105, based on (i) the rear temperature signal Sr_temp, (ii) the rear image data Dr_image, and (iii) the rear sound signal Sr_sound. When the vehicle air conditioning apparatus 10 executes the active outside-air circulation control, the vehicle air conditioning apparatus 10 controls the operation position of the circulation switching valve 30F, the operation position of the rear air taking switching valve 30R, an operation of the front blower 20F, and an operation of the rear blower 20R as follows.

When the vehicle air conditioning apparatus 10 determines that the pathogens such as the virus exist in the vehicle interior 105, the vehicle air conditioning apparatus 10 sets the operation position of the circulation switching valve 30F at the outside-air circulation position. In addition, the vehicle air conditioning apparatus 10 sets the operation position of the rear air taking switching valve 30R at a position depending on seating positions of the infected rear passengers Pr.

In particular, when the vehicle air conditioning apparatus 10 determines that only the rear passenger Pr seating on the right side of the rear passenger's seat 100R has an infection, the vehicle air conditioning apparatus 10 sets the operation position of the rear air taking switching valve 30R at the right air taking position. When the vehicle air conditioning apparatus 10 determines that only the rear passenger Pr seating on the left side of the rear passenger's seat 100R has an infection, the vehicle air conditioning apparatus 10 sets the operation position of the rear air taking switching valve 30R at the left air taking position. When the vehicle air conditioning apparatus 10 determines that only the rear passenger Pr seating on the center of the rear passenger's seat 100R has an infection, the vehicle air conditioning apparatus 10 sets the operation position of the rear air taking switching valve 30R at a left-and-right air taking position. When at least two of (i) the rear passenger Pr seating on the right side of the rear passenger's seat 100R, (ii) the rear passenger Pr seating on the left side of the rear passenger's seat 100R, and (iii) the rear passenger Pr seating on the center of the rear passenger's seat 100R, have infections, the vehicle air conditioning apparatus 10 sets the operation position of the rear air taking switching valve 30R at the left-and-right air taking position. In addition, the vehicle air conditioning apparatus 10 operates the front blower 20F and the rear blower 20R.

Thereby, when at least one of the rear passengers Pr has an infection, the air is taken from the vehicle interior 105 via the right rear interior-air taking opening 63R and/or the left rear interior-air taking opening 63L provided near the infected rear passengers Pr. Therefore, the air which may include the pathogens is prevented from contacting to the driver Pd and the front passenger Pf. Thus, the driver Pd and the front passenger Pf can be prevented from catching infections. In addition, the air which may include the pathogens is prevented from contacting to the other rear passenger(s) Pr not infected. Thus, the other rear passenger(s) Pf not infected can be prevented from catching an infection/infections.

The vehicle air conditioning apparatus 10 may be configured to determine that the pathogens exist in the vehicle interior 105 when at least two of (i) a body temperature condition, (ii) an image data condition, and (iii) a rear sound condition, are satisfied. The body temperature condition is a condition that the vehicle air conditioning apparatus 10 determines that the body temperature Tr_body of at least one of the rear passengers Pr is higher than or equal to the predetermined body temperature Tbody_th. The image data condition is a condition that the vehicle air conditioning apparatus 10 determines, based on the rear image data Dr_image that at least one of the rear passengers Pr has made the biological reaction of the predetermined number of times Nth or more within the predetermined period of time Tth. The rear sound condition is a condition that the vehicle air conditioning apparatus 10 determines, based on the rear sound signal Sr_sound that at least one of the rear passengers Pr has made the biological reaction of the predetermined number of times Nth or more within the predetermined period of time Tth.

Further, the vehicle air conditioning apparatus 10 may be configured to execute the normal interior-air circulation control without executing the active outside-air circulation control when the vehicle air conditioning apparatus 10 determines that the pathogens exist in the vehicle interior 105 as the normal interior-air circulation control is requested to be executed by the driver Pd or the front passenger Pf operating the circulation changing switch 97.

Further, the vehicle air conditioning apparatus 10 may be configured to execute the active outside-air circulation control and cause the display device 50 to display that the active outside-air circulation control is executed when the normal interior-air circulation control is not requested to be execute by the driver Pd or the front passenger Pf operating the circulation changing switch 97. In this case, the vehicle air conditioning apparatus 10 stops executing the active outside-air circulation control and executes the normal interior-air circulation control when the normal interior-air circulation control is requested to be executed by the driver Pd or the front passenger Pf operating the circulation changing switch 97 after the vehicle air conditioning apparatus 10 causes the display device 50 to display that the active outside-air circulation control is executed.

<Particular Operations of Vehicle Air Conditioning Apparatus>

Next, particular operations of the vehicle air conditioning apparatus 10 will be described. The CPU of the ECU 90 of the vehicle air conditioning apparatus 10 is configured to or programmed to execute a routine shown in FIG. 5 each time a predetermined time Tcal elapses. At a predetermined timing, the CPU starts a process from a step 500 in FIG. 5 and proceeds with the process to a step 505 to determine whether a value of a passenger flag Xper is "1." The value of the passenger flag Xper is set to "1" when at least one rear passenger Pr exists. On the other hand, the value of the passenger flag Xper is set to "0" when no rear passengers Pr exist.

When the CPU determines "Yes" at the step 505, the CPU proceeds with the process to a step 510 to determine whether a value of a fever flag Xtemp is "1." The value of the fever flag Xtemp is set to "1" when the CPU determines that the body temperature Tr_body of at least one of the rear passengers Pr is higher than or equal to the predetermined body temperature Tbody_th. On the other hand, the value of the fever flag Xtemp is set to "0" when the CPU determines that the body temperatures Tr_body of all the rear passengers Pr are lower than the predetermined body temperature Tbody_th.

When the CPU determines "Yes" at the step 510, the CPU proceeds with the process to a step 520.

On the other hand, when the CPU determines "No" at the step 510, the CPU proceeds with the process to a step 515 to determine whether a value of a biological reaction flag Xreact is "1." The value of the biological reaction flag Xreact is set to "1" when the CPU determines that at least one of the rear passengers Pr has made the biological reaction of the predetermined number of times Nth or more within the predetermined period of time Tth. On the other hand, the value of the biological reaction flag Xreact is set to "0" when the CPU determines that all the rear passengers Pr have not made the biological reaction of the predetermined number of times Nth or more within the predetermined period of time Tth.

When the CPU determines "Yes" at the step 515, the CPU proceeds with the process to the step 520.

When the CPU proceeds with the process to the step 520, the CPU determines whether a value of an interior-air circulation blowing flag Xin_air is "1." The value of the interior-air circulation blowing flag Xin_air is set to "1" when (i) the circulation changing switch 97 is set at the interior-air circulation request position, and (ii) the blowing switch 98 is set at the ON position. On the other hand, the value of the interior-air circulation blowing flag Xin_air is set to "0" when the circulation changing switch 97 is set at the outside-air circulation request position. Also, the value of the interior-air circulation blowing flag Xin_air is set to "0" when the blowing switch 98 is set at the OFF position.

When the CPU determines "Yes" at the step 520, the CPU proceeds with the process to a step 525 to determine whether an elapsed time Tout_air is shorter than a predetermined time Tout_air. The elapsed time Tout_air corresponds to a time elapsing after the active outside-air circulation control starts to be executed.

When the CPU determines "Yes" at the step 525, the CPU proceeds with the process to a step 530 to cause the display device 50 to display a notice image which notices that the active outside-air circulation control is executed. Next, the CPU proceeds with the process to a step 535 to set the operation position of the circulation switching valve 30F at the outside-air circulation position. Next, the CPU proceeds with the process to a step 540 to set the operation position of the rear air taking switching valve 30R at a position depending on the seating positions of the infected rear passengers Pr. Next, the CPU proceeds with the process to a step 545 to operate the front blower 20F and the rear blower 20R. Then, the CPU proceeds with the process to a step 595 to terminate this routine once.

On the other hand, when the CPU determines "No" at the step 525, the CPU proceeds with the process to a step 550. Also, when the CPU determines "No" at the step 520, the CPU proceeds with the process to the step 550. Also, when the CPU determines "No" at the step 515, the CPU proceeds with the process to the step 550. Also, when the CPU determines "No" at the step 505, the CPU proceeds with the process to the step 550.

When the CPU proceeds with the process to the step 550, the CPU terminates displaying the notification image on the display device 50 for noticing that the active outside-air circulation control is executed. Next, the CPU proceeds with the process to a step 555 to set the operation position of the circulation switching valve 30F at the shut-off position. Next, the CPU proceeds with the process to a step 560 to set the operation position of the rear air taking switching valve 30R at the shut-off position. Next, the CPU proceeds with the process to a step 565 to stop operating the front blower 20F and the rear blower 20R. Next, the CPU proceeds with the process to a step 570 to execute a routine shown in FIG. 6.

When the CPU proceeds with the process to the step 570, the CPU starts a process from a step 600 and proceeds with the process to a step 605 to determine whether a value of a blowing request flag Xair is "1." When the CPU determines "Yes" at the step 605, the CPU proceeds with the process to a step 610 to determine whether a value of the interior-air circulation request flag Xin is "0."

When the CPU determines "Yes" at the step 610, the CPU proceeds with the process to a step 615 to set the operation position of the circulation switching valve 30F at the outside-air circulation position. Next, the CPU proceeds with the process to a step 620 to set the operation position of the rear air taking switching valve 30R at the left-and-right air taking position. Next, the CPU proceeds with the process to a step 625 to operates the front blower 20F and the rear blower 20R. Next, the CPU proceeds with the process to a step 630 to control the operations of the cooling-heating apparatus 40 to accomplish the set temperature Tset. Next, the CPU proceeds with the process to the step 595 in FIG. 5 via a step 695 to terminate this routine once.

On the other hand, when the CPU determines "No" at the step 610, the CPU proceeds with the process to a step 635 to set the operation position of the circulation switching valve 30F at the interior-air circulation position. Next, the CPU proceeds with the process to a step 640 to set the operation position of the rear air taking switching valve 30R at the shut-off position. Next, the CPU proceeds with the process to a step 645 to operate the front blower 20F and stop operating the rear blower 20R. Next, the CPU proceeds with the process to a step 650 to control the operations of the cooling-heating apparatus 40 to accomplish the set temperature Tset. Next, the CPU proceeds with the process to the step 595 in FIG. 5 via the step 695 to terminate this routine once.

On the other hand, when the CPU determines "No" at the step 605, the CPU proceeds with the process to a step 655 to set the operation position of the circulation switching valve 30F at the shut-off position. Next, the CPU proceeds with the process to a step 660 to set the operation position of the rear air taking switching valve 30R at the shut-off position. Next, the CPU proceeds with the process to a step 665 to stop operating the front blower 20F and the rear blower 20R. Next, the CPU proceeds with the process to a step 670 to stop operating the cooling-heating apparatus 40.

Figure 5:
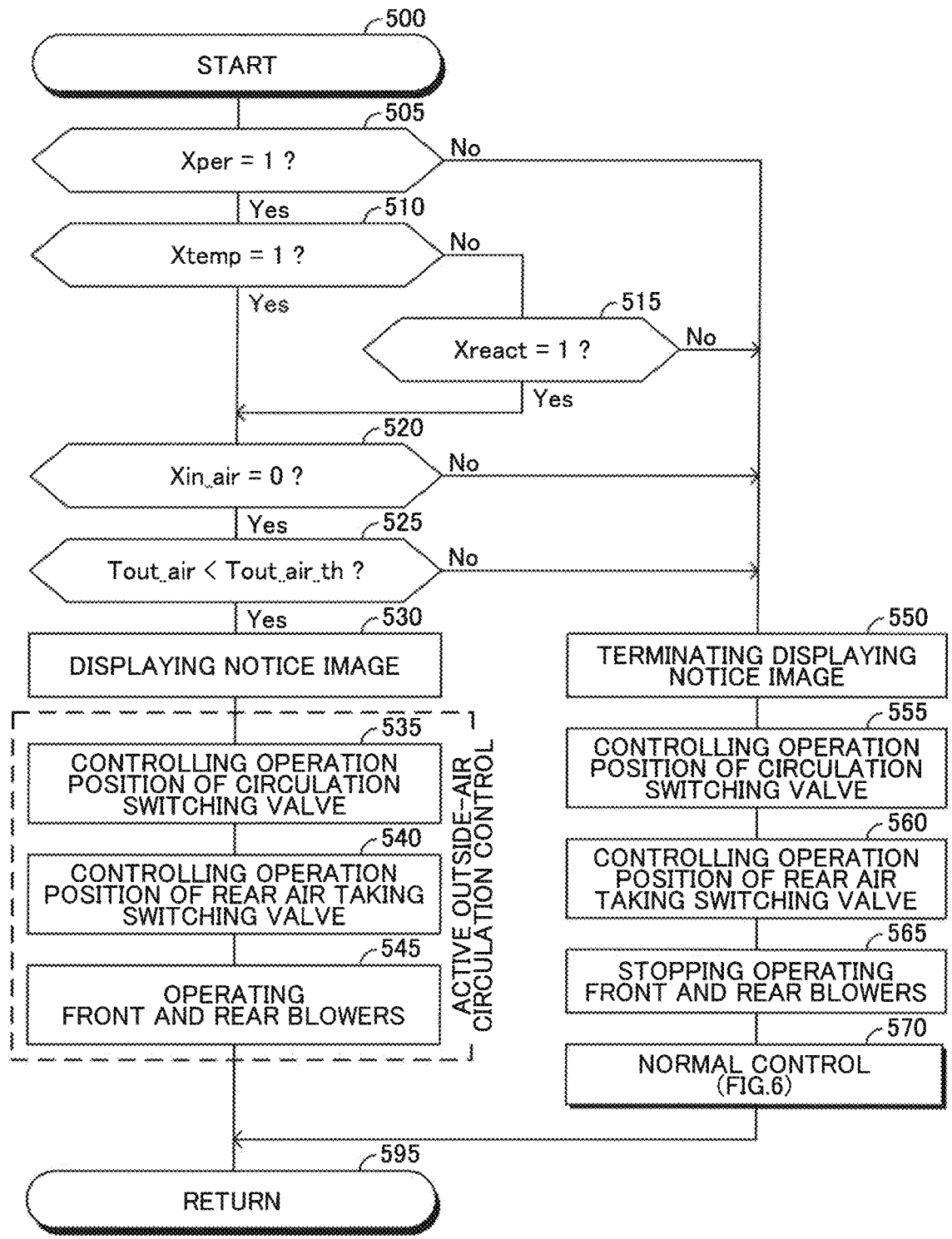
FIG. 5 is a view which shows a flowchart of a routine executed by a CPU of an ECU of the vehicle air conditioning apparatus according to the embodiment of the invention.

Next, the CPU proceeds with the process to the step 595 in FIG. 5 via the step 695 to terminate this routine once.

The particular operations of the vehicle air conditioning apparatus 10 have been described. Thereby, even if at least one rear passenger Pr has an infection, the air which may include the pathogens is prevented from contacting to the driver Pd, the front passenger Pf, and the other rear passenger(s) Pf not infected. Thus, the driver Pd, the front passenger Pf, and the other rear passenger(s) Pf not infected can be prevented from catching infections.

First Modified Example

Figure 7:
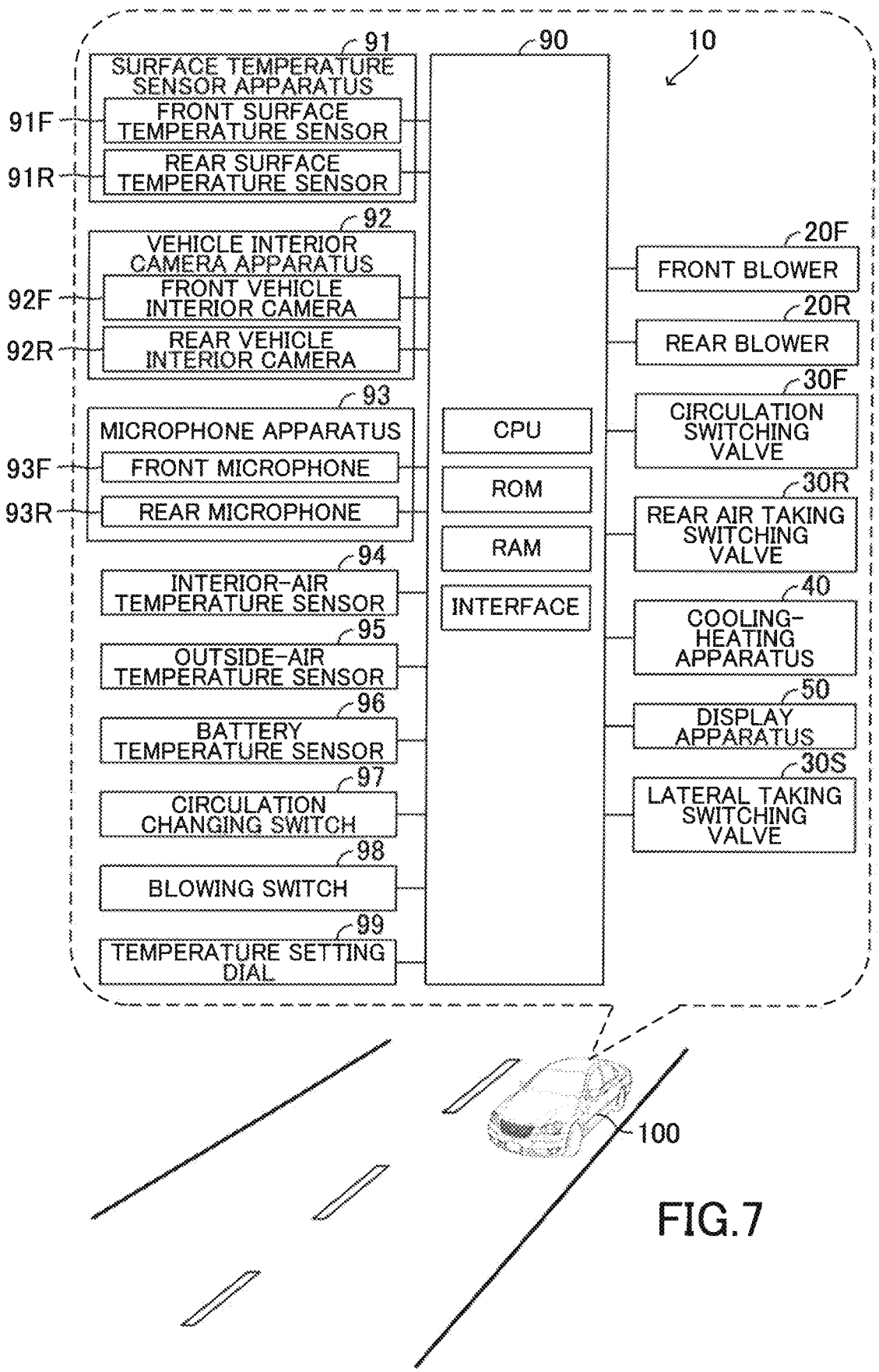
FIG. 7 is a view which shows the vehicle air conditioning apparatus according to a first modified example of the embodiment of the invention and the vehicle to which the vehicle air conditioning apparatus according to the first modified example is applied.
Figure 8:
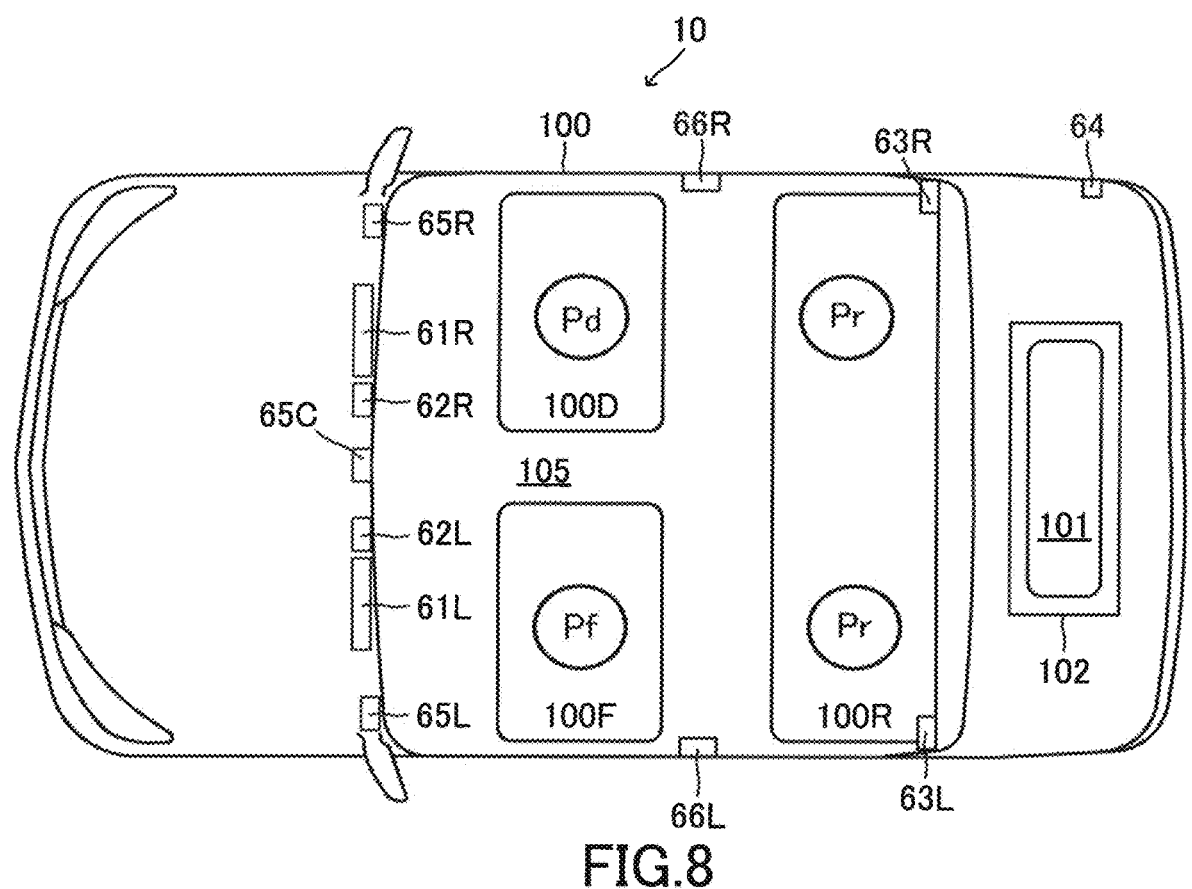
FIG. 8 is a top view which shows the vehicle to which the vehicle air conditioning apparatus according to the first modified example is applied.

The vehicle air conditioning apparatus 10 may be configured as described below. As shown in FIG. 7, the vehicle air conditioning apparatus 10 according to a first modified example of the embodiment of the invention further includes a lateral air taking switching valve 30S. In addition, as shown in FIG. 8, the vehicle air conditioning apparatus 10 according to the first modified example includes a lateral right interior-air taking opening 66R and a lateral left interior-air taking opening 66L.

The lateral right interior-air taking opening 66R is an opening for taking the air from the vehicle interior 105. The lateral right interior-air taking opening 66R is provided on a wall (for example, a B pillar) defining the vehicle interior 105 at a rearward-right side of the driver's seat 100D and a forward-right side of the rear passenger's seat 100R. The lateral right interior-air taking opening 66R is exposed to the vehicle interior 105.

The lateral left interior-air taking opening 66L is an opening for taking the air from the vehicle interior 105. The lateral left interior-air taking opening 66L is provided on a wall (for example, a B pillar) defining the vehicle interior 105 at a rearward-left side of the front passenger's seat 100F and a forward-left side of the rear passenger's seat 100R. The lateral left interior-air taking opening 66L is exposed to the vehicle interior 105.

Figure 9:
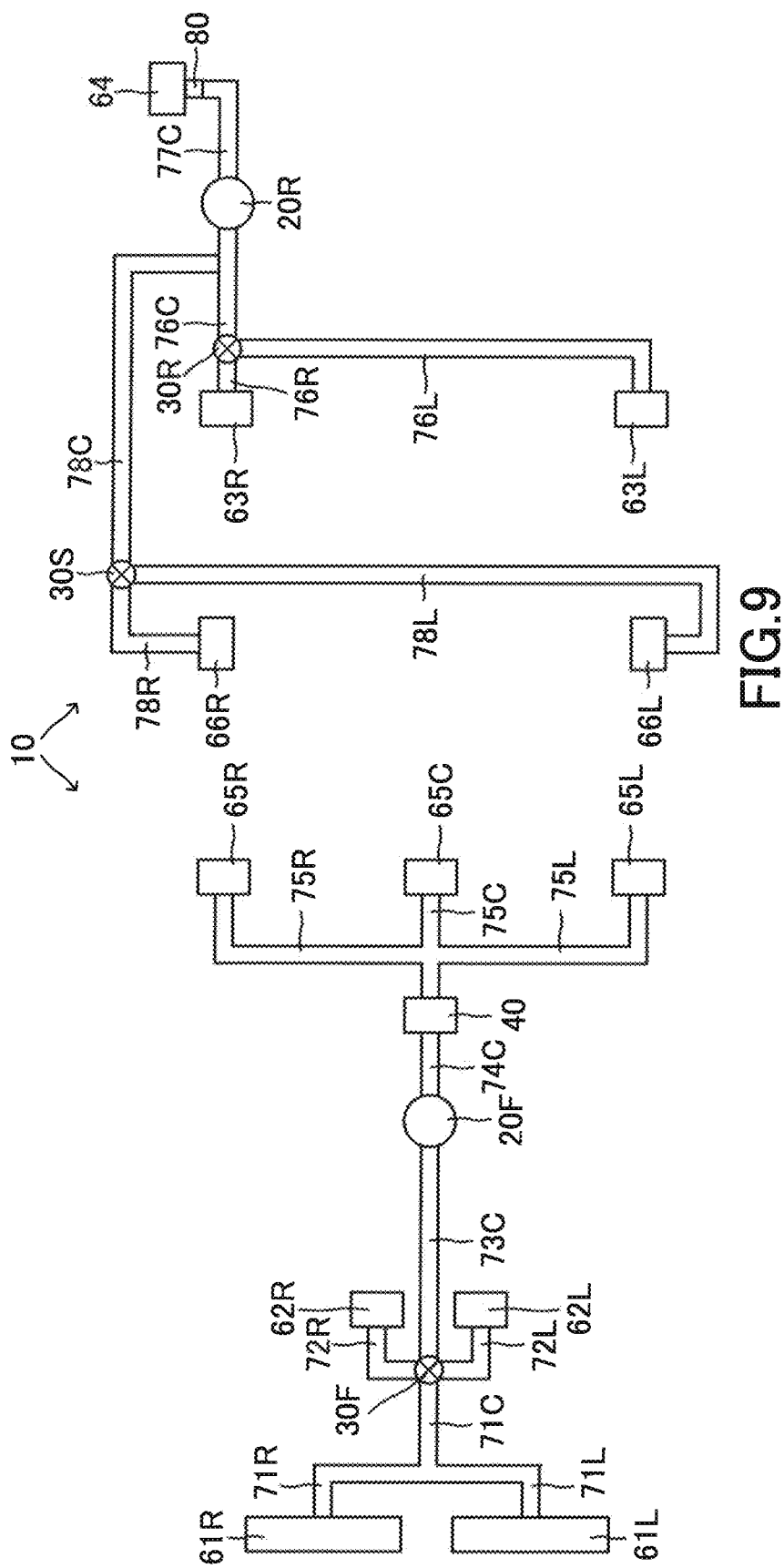
FIG. 9 is a general view which shows the vehicle air conditioning apparatus according to the first modified example is applied.

As shown in FIG. 9, the lateral right interior-air taking opening 66R is fluidically connected to the lateral air taking switching valve 30S via a lateral right interior-air taking duct 78R. The lateral left interior-air taking opening 66L is fluidically connected to the lateral air taking switching valve 30S via a lateral left interior-air taking duct 78L. The lateral air taking switching valve 30S is fluidically connected to the rear common interior-air taking duct 76C between the rear air taking switching valve 30R and the rear blower 20R via a lateral common interior-air taking duct 78C.

When (i) the rear blower 20R is operated, and (ii) an operation position of the lateral air taking switching valve 30S is set at a right air taking position, the air in the vehicle interior 105 is taken to the rear blower 20R from the lateral right interior-air taking opening 66R via the lateral right interior-air taking duct 78R, the lateral air taking switching valve 30S, the lateral common interior-air taking duct 78C, and the rear common interior-air taking duct 76C. The air taken to the rear blower 20R is discharged to the outside of the vehicle 100 from the interior-air discharging opening 64 via the common interior-air discharging duct 77C.

On the other hand, when (i) the rear blower 20R is operated, and (ii) the operation position of the lateral air taking switching valve 30S is set at a left air taking position, the air in the vehicle interior 105 is taken to the rear blower 20R from the lateral left interior-air taking opening 66L via the lateral left interior-air taking duct 78L, the lateral air taking switching valve 30S, the lateral common interior-air taking duct 78C, and the rear common interior-air taking duct 76C. The air taken to the rear blower 20R is discharged to the outside of the vehicle 100 from the interior-air discharging opening 64 via the common interior-air discharging duct 77C.

Further, when (i) the rear blower 20R is operated, and (ii) the operation position of the lateral air taking switching valve 30S is set at a left-and-right air taking position, the air in the vehicle interior 105 is taken to the rear blower 20R from the lateral right interior-air taking opening 66R via the lateral right interior-air taking duct 78R, the lateral air taking switching valve 30S, the lateral common interior-air taking duct 78C, and the rear common interior-air taking duct 76C. Also, the air in the vehicle interior 105 is taken to the rear blower 20R from the lateral left interior-air taking opening 66L via the lateral left interior-air taking duct 78L, the lateral air taking switching valve 30S, the lateral common interior-air taking duct 78C, and the rear common interior-air taking duct 76C. The air taken to the rear blower 20R is discharged to the outside of the vehicle 100 from the interior-air discharging opening 64 via the common interior-air discharging duct 77C.

When the operation position of the lateral air taking switching valve 30S is set at a shut-off position, the air is not taken to the lateral right interior-air taking duct 78R nor the lateral left interior-air taking duct 78L from the vehicle interior 105.

As shown in FIG. 7, the lateral air taking switching valve 30S is electrically connected to the ECU 90. The ECU 90 can control the operation position of the lateral air taking switching valve 30S.

Further, as shown in FIG. 7, the surface temperature sensor apparatus 91 of the vehicle air conditioning apparatus 10 according to the first modified example includes a front surface temperature sensor 91F in addition to the rear surface temperature sensor 91R. Further, the vehicle interior camera apparatus 92 of the vehicle air conditioning apparatus 10 according to the first modified example includes a front vehicle interior camera 92F in addition to the rear vehicle interior camera 92R. Further, the microphone apparatus 93 of the vehicle air conditioning apparatus 10 according to the first modified example includes a front microphone 93F in addition to the rear microphone 93R.

<Front Surface Temperature Sensor>

Figure 10:
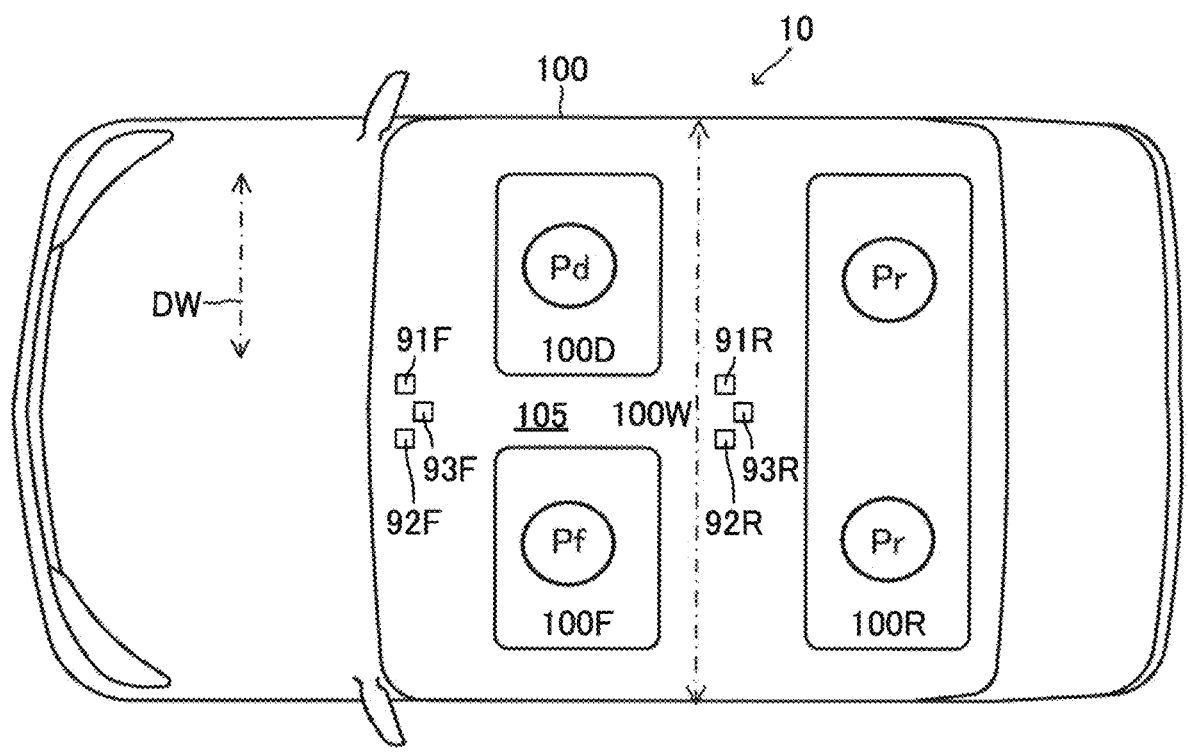
FIG. 10 is a top view which shows the vehicle to which the vehicle air conditioning apparatus according to the first modified example is applied.

The front surface temperature sensor 91F may detect the infrared rays radiated from the objects. The surface temperature sensor apparatus 91 is the thermography which detects the surface temperature of the object by analyzing infrared rays detected by the front surface temperature sensor 91F. The front surface temperature sensor 91F is mounted on the vehicle interior ceiling 106 to detect a temperatures Td_face of skin of a face of the driver Pd and a temperature Tf_face of skin of a face of the front passenger Pf. As shown in FIG. 10, in this example, the front surface temperature sensor 91F is mounted on the vehicle interior ceiling 106 at the center position in the vehicle width 100W in the vehicle width direction DW on a forward-left side of the driver's seat 100D and a forward-right side of the front passenger's seat 100F.

As shown in FIG. 7, the front surface temperature sensor 91F is electrically connected to the ECU 90. The front surface temperature sensor 91F detects the temperature Td_face of the skin of the face of the driver Pd and the temperature Tf_face of the skin of the face of the front passenger Pf. The front surface temperature sensor 91F sends signals Sf_temp representing the detected temperatures Td_face and Tf_face to the ECU 90. Hereinafter, the signal Sf_temp will be referred to as "the front temperature signal Sf_temp."

The ECU 90 acquires the temperature Td_face of the skin of the face of the driver Pd and the temperature Tf_face of the skin of the face of the front passenger Pf, based on the front temperature signals Sf_temp. The ECU 90 estimates a body temperature Td_body of the driver Pd, based on the acquired temperature Td_face and estimates a body temperature Tf_body of the front passenger Pf, based on the acquired temperature Tf_face. The ECU 90 determines that the driver Pd has an infection such as a cold when the estimated body temperature Td_body is higher than or equal to the predetermined body temperature Tbody_th. Similarly, the ECU 90 determines that the front passenger Pf has an infection such as a cold when the estimated body temperature Tf_body is higher than or equal to the predetermined body temperature Tbody_th. In this case, the ECU 90 also determines that pathogens such as bacteria and virus exist in the vehicle interior 105.

<Front Vehicle Interior Camera>

The front vehicle interior camera 92F is mounted on the vehicle interior ceiling 106 to take images of the driver Pd and the front passenger Pf. As shown in FIG. 10, in this example, the front vehicle interior camera 92F is mounted on the vehicle interior ceiling 106 at the center position in the vehicle width 100W in the vehicle width direction DW at the forward-left side of the driver's seat 100D and at the forward-right side of the front passenger's seat 100F.

The front vehicle interior camera 92F is electrically connected to the ECU 90. The front vehicle interior camera 92F takes an image of the vehicle interior 105 including the driver Pd and the front passenger Pf. The front vehicle interior camera 92F sends data Df_image on the taken image to the ECU 90. Hereinafter, the data Df_image will be referred to as "the front image data Df_image."

The ECU 90 determines whether the driver Pd and the front passenger Pf have made biological reaction such as coughing and sneezing, based on the front image data Df_image. When the ECU 90 determines that the driver Pd has made the biological reaction of the predetermined number of times Nth or more within the predetermined period of time Tth, the ECU 90 determines that the driver Pd has an infection such as a cold. In this case, the ECU 90 also determines that the pathogens such as the virus exist in the vehicle interior 105. When the ECU 90 determines that the front passenger Pf has made the biological reaction of the predetermined number of times Nth or more within the predetermined period of time Tth, the ECU 90 determines that the front passenger Pf has an infection such as a cold. In this case, the ECU 90 also determines that the pathogens such as the virus exist in the vehicle interior 105.

In addition, the ECU 90 determines whether there is the driver Pd and there is the front passenger Pf, based on the front image data Df_image.

<Front Microphone>

The front microphone 93F is mounted on the vehicle interior ceiling 106 to detect sound generated by the driver Pd and the front passenger Pf. As shown in FIG. 10, in this example, the front microphone 93F is mounted on the vehicle interior ceiling 106 at the center position in the vehicle width 100W in the vehicle width direction DW at the forward-left side of the driver's seat 100D and at the forward-right side of the front passenger's seat 100F.

As shown in FIG. 7, the front microphone 93F is electrically connected to the ECU 90. The front microphone 93F detects the sound generated in the vehicle interior 105. The front microphone 93F sends a signal Sf_sound representing the detected sound to the ECU 90. Hereinafter, the signal Sf_sound will be referred to as "the front sound signal Sf_sound."

The ECU 90 determines whether the driver Pd and the front passenger Pf have made the biological reaction such as coughing and sneezing, based on the front sound signal Sf_sound. When the ECU 90 determines that the driver Pd has made the biological reaction of the predetermined number of times Nth or more within the predetermined period of time Tth, the ECU 90 determines that the driver Pd has an infection such as a cold. In this case, the ECU 90 also determines that the pathogens such as the virus exist in the vehicle interior 105. In addition, when the ECU 90 determines that the front passenger Pf has made the biological reaction of the predetermined number of times Nth or more within the predetermined period of time Tth, the ECU 90 determines that the front passenger Pf has an infection such as a cold. In this case, the ECU 90 also determines that the pathogens such as the virus exist in the vehicle interior 105.

<Summary of Operations of Vehicle Air Conditioning Apparatus According to First Modified Example>

Next, a summary of operations of the vehicle air conditioning apparatus 10 according to the first modified example will be described.

The vehicle air conditioning apparatus 10 starts to execute the active outside-air circulation control when the vehicle air conditioning apparatus 10 determines that the pathogens such as the virus exist in the vehicle interior 105, based on (i) the front temperature signal Sf_temp, (ii) the front image data Df_image, (iii) the front sound signal Sf_sound, (iv) the rear temperature signal Sr_temp, (v) the rear image data Dr_image, and (vi) the rear sound signal Sr_sound. When the vehicle air conditioning apparatus 10 executes the active outside-air circulation control, the vehicle air conditioning apparatus 10 controls the operation position of the circulation switching valve 30F, the operation position of the rear air taking switching valve 30R, the operation of the front blower 20F, and the operation of the rear blower 20R as follows.

When the vehicle air conditioning apparatus 10 determines that the pathogens such as the virus exist in the vehicle interior 105, the vehicle air conditioning apparatus 10 sets the operation position of the circulation switching valve 30F at an outside-air circulation position.

In addition, the vehicle air conditioning apparatus 10 sets the operation position of the rear air taking switching valve 30R at a position depending on the seating positions of the infected rear passengers Pr. In particular, when the vehicle air conditioning apparatus 10 determines that only the rear passenger Pr seating on the right side of the rear passenger's seat 100R has an infection, the vehicle air conditioning apparatus 10 sets the operation position of the rear air taking switching valve 30R at the right air taking position. When the vehicle air conditioning apparatus 10 determines that only the rear passenger Pr seating on the left side of the rear passenger's seat 100R has, the vehicle air conditioning apparatus 10 sets the operation position of the rear air taking switching valve 30R at the left air taking position. When the vehicle air conditioning apparatus 10 determines that only the rear passenger Pr seating on the center of the rear passenger's seat 100R has an infection, the vehicle air conditioning apparatus 10 sets the operation position of the rear air taking switching valve 30R at the left-and-right air taking position. When the vehicle air conditioning apparatus 10 determines that at least two of (i) the rear passenger Pr seating on the right side of the rear passenger's seat 100R, (ii) the rear passenger Pr seating on the left side of the rear passenger's seat 100R, and (iii) the rear passenger Pr seating on the center of the rear passenger's seat 100R, have infections, the vehicle air conditioning apparatus 10 sets the operation position of the rear air taking switching valve 30R at the left-and-right air taking position.

In addition, the vehicle air conditioning apparatus 10 sets the operation position of the lateral air taking switching valve 30S at a position depending on whether the driver Pd has an infection or not and whether the front passenger Pf has an infection or not. In particular, when the vehicle air conditioning apparatus 10 determines that only the driver Pd has an infection, the vehicle air conditioning apparatus 10 sets the operation position of the lateral air taking switching valve 30S at the right air taking position. When the vehicle air conditioning apparatus 10 determines that only the front passenger Pf has an infection, the vehicle air conditioning apparatus 10 sets the operation position of the lateral air taking switching valve 30S at the left air taking position. When the vehicle air conditioning apparatus 10 determines that both the driver Pd and the front passenger Pf have infections, the vehicle air conditioning apparatus 10 sets the operation position of the lateral air taking switching valve 30S at the left-and-right air taking position.

In addition, the vehicle air conditioning apparatus 10 operates the front blower 20F and the rear blower 20R.

Thereby, when the driver Pd has an infection, the air in the vehicle interior 105 is taken from the lateral right interior-air taking opening 66R provided near the driver Pd. Therefore, the air which may include the pathogens is prevented from contacting to the front passenger Pf and the rear passengers Pr. Thus, the front passenger Pf and the rear passengers Pr can be prevented from catching infections.

Further, when the front passenger Pf has an infection, the air in the vehicle interior 105 is taken from the lateral left interior-air taking opening 66L provided near the front passenger Pf. Therefore, the air which may include the pathogens is prevented from contacting to the driver Pd and the rear passengers Pr. Thus, the driver Pd and the rear passengers Pr can be prevented from catching infections.

Further, when at least one rear passenger Pr has an infection, the air in the vehicle interior 105 is taken from the right rear interior-air taking opening 63R and/or the left rear interior-air taking opening 63L provided near the infected rear passengers Pr. Therefore, the air which may include the pathogens is prevented from contacting to the driver Pd and the front passenger Pf. Thus, the driver Pd and the front passenger Pf can be prevented from catching infections. In addition, the air which may include the pathogens is prevented from contacting to the other rear passenger(s) Pr not infected. Thus, the other rear passenger(s) Pf not infected can be prevented from catching an infection/infections.

<Particular Operations of Vehicle Air Conditioning Apparatus According to First Modified Example>

Figure 6:
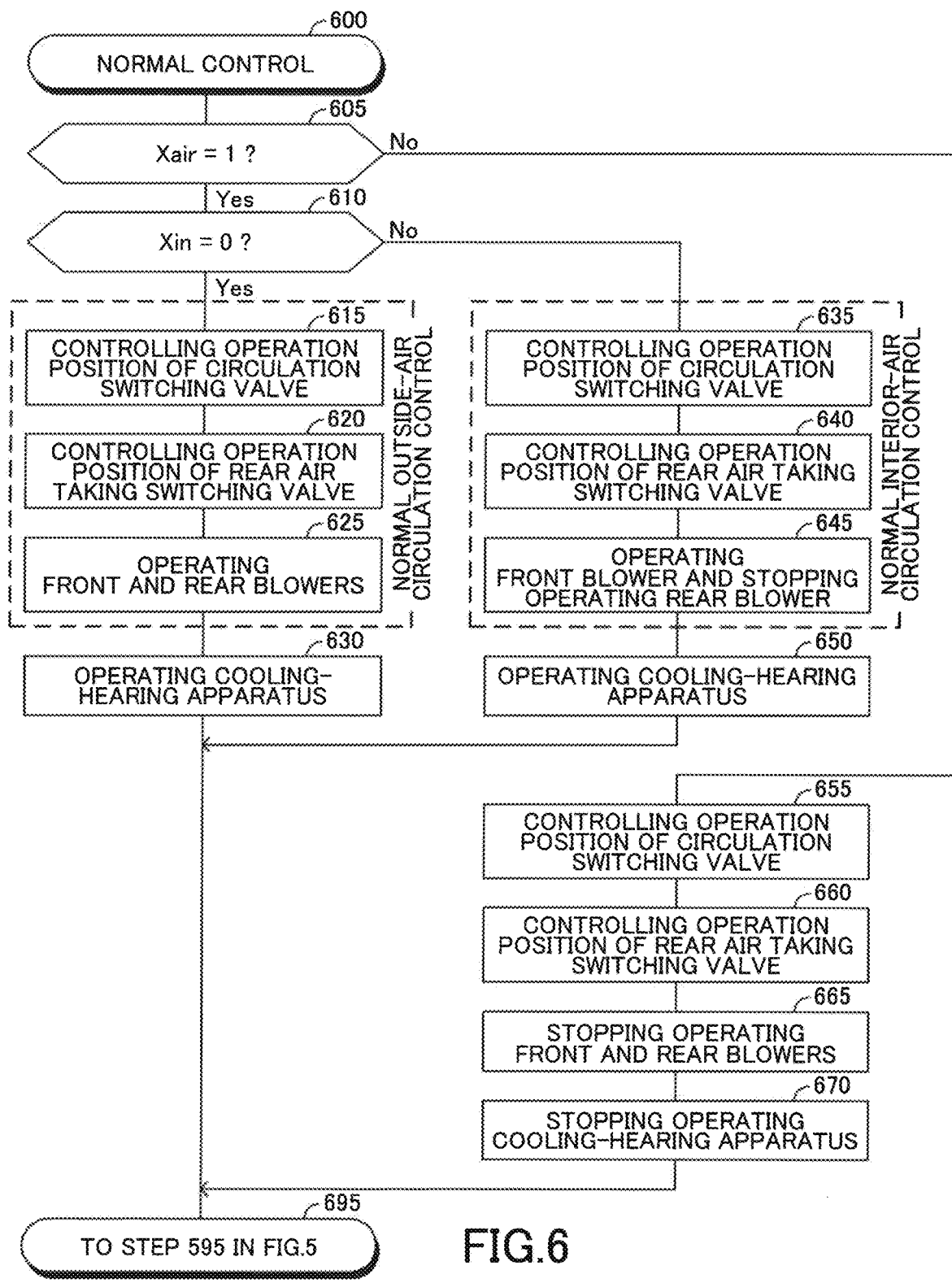
FIG. 6 is a view which shows a flowchart of a routine executed by the CPU.

The CPU of the ECU 90 of the vehicle air conditioning apparatus 10 according to the first modified example is configured to or programmed to execute the routines shown in FIG. 5 and FIG. 6 each time the predetermined time Tcal elapses.

When the CPU according to the first modified example executes the routines shown in FIG. 5 and FIG. 6, the value of the passenger flag Xper is set to "1" when at least one of the driver Pd, the front passenger Pf, and the rear passengers Pr exists. On the other hand, the value of the passenger flag Xper is set to "0" when the driver Pd, the front passenger Pf, and the rear passengers Pr do not exist.

Further, the value of the fever flag Xtemp is set to "1" when the CPU determines that at least one of the body temperature Td_body of the driver Pd, the body temperature Tf_body of the front passenger Pf, and the body temperatures Tr_body of the rear passengers Pr is higher than or equal to the predetermined body temperature Tbody_th. On the other hand, the value of the fever flag Xtemp is set to "0" when the CPU determines that the body temperature Td_body of the driver Pd, the body temperature Tf_body of the front passenger Pf, and the body temperatures Tr_body of the rear passengers Pr are all lower than the predetermined body temperature Tbody_th.

Further, the value of the biological reaction flag Xreact is set to "1" when the CPU determines that at least one of the driver Pd, the front passenger Pf, and the rear passengers Pr has made the biological reaction of the predetermined number of times Nth or more within the predetermined period of time Tth. On the other hand, the value of the biological reaction flag Xreact is set to "0" when the CPU determines that all the driver Pd, the front passenger Pf, and the rear passengers Pr have not made the biological reaction of the predetermined number of times Nth or more within the predetermined period of time Tth.

Further, when the CPU proceeds with the process to the step 540 in FIG. 5, the CPU sets the operation position of the lateral air taking switching valve 30S at a position depending on whether the driver Pd has an infection or not and whether the front passenger Pf has an infection or not and sets the operation position of the rear air taking switching valve 30R at a position depending on the seating positions of the infected rear passengers Pr. Further, when the CPU proceeds with the process to the step 560 in FIG. 5, the CPU sets the operation positions of the lateral air taking switching valve 30S and the rear air taking switching valve 30R at the shut-off positions, respectively.

Further, when the CPU proceeds with the process to the step 620 in FIG. 6, the CPU sets the operation position of the lateral air taking switching valve 30S at the shut-off position and sets the operation position of the rear air taking switching valve 30R at the left-and-right air taking position. When the CPU proceeds with the process to the step 640 in FIG. 6, the CPU sets the operation positions of the lateral air taking switching valve 30S and the rear air taking switching valve 30R at the shut-off positions, respectively. When the CPU proceeds with the process to the step 660 in FIG. 6, the CPU sets the operation positions of the lateral air taking switching valve 30S and the rear air taking switching valve 30R at the shut-off positions, respectively.

Second Modified Example

Figure 11:
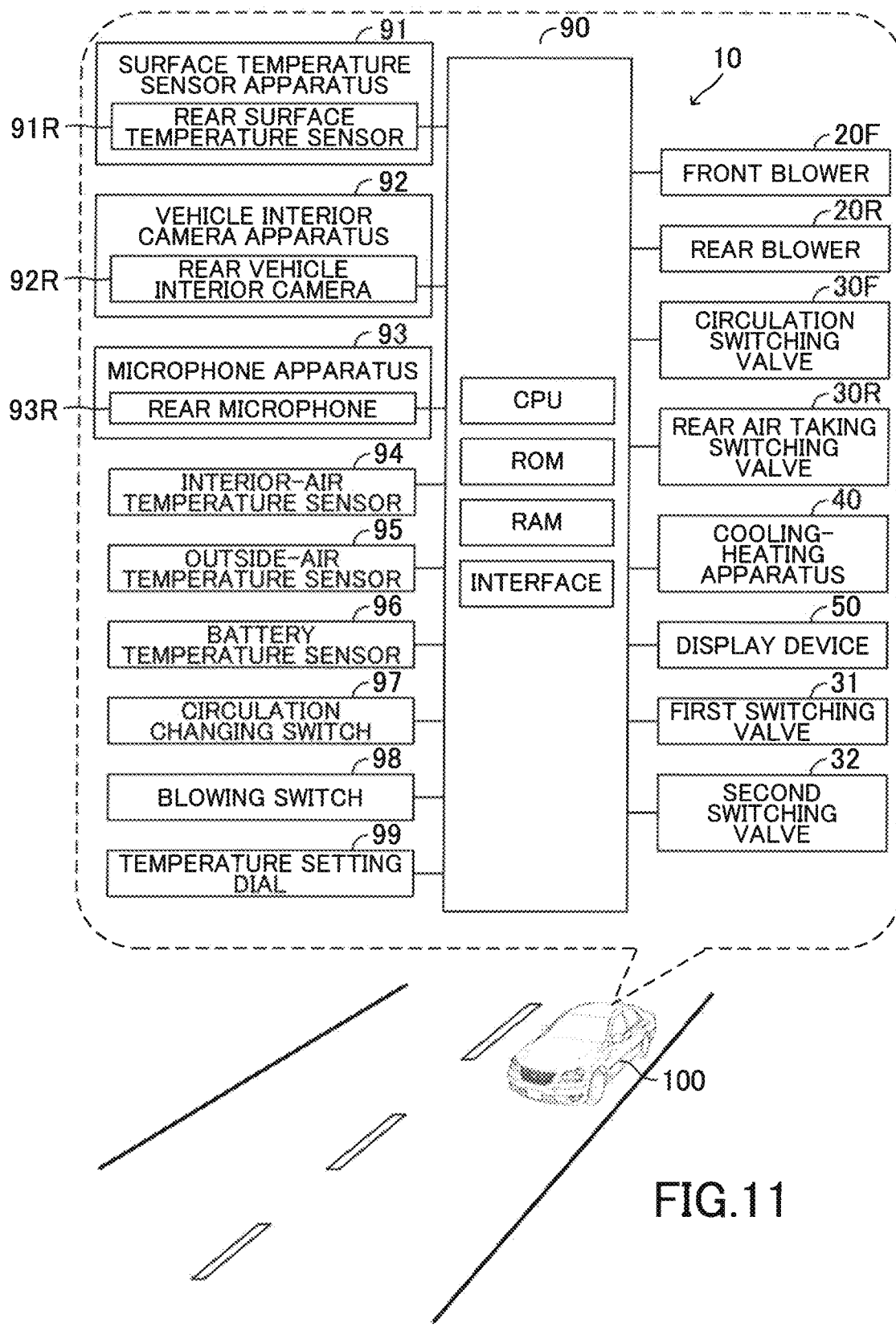
FIG. 11 is a view which shows the vehicle air conditioning apparatus according to a second modified example of the embodiment of the invention and the vehicle to which the vehicle air conditioning apparatus according to the second modified example is applied.
Figure 12:
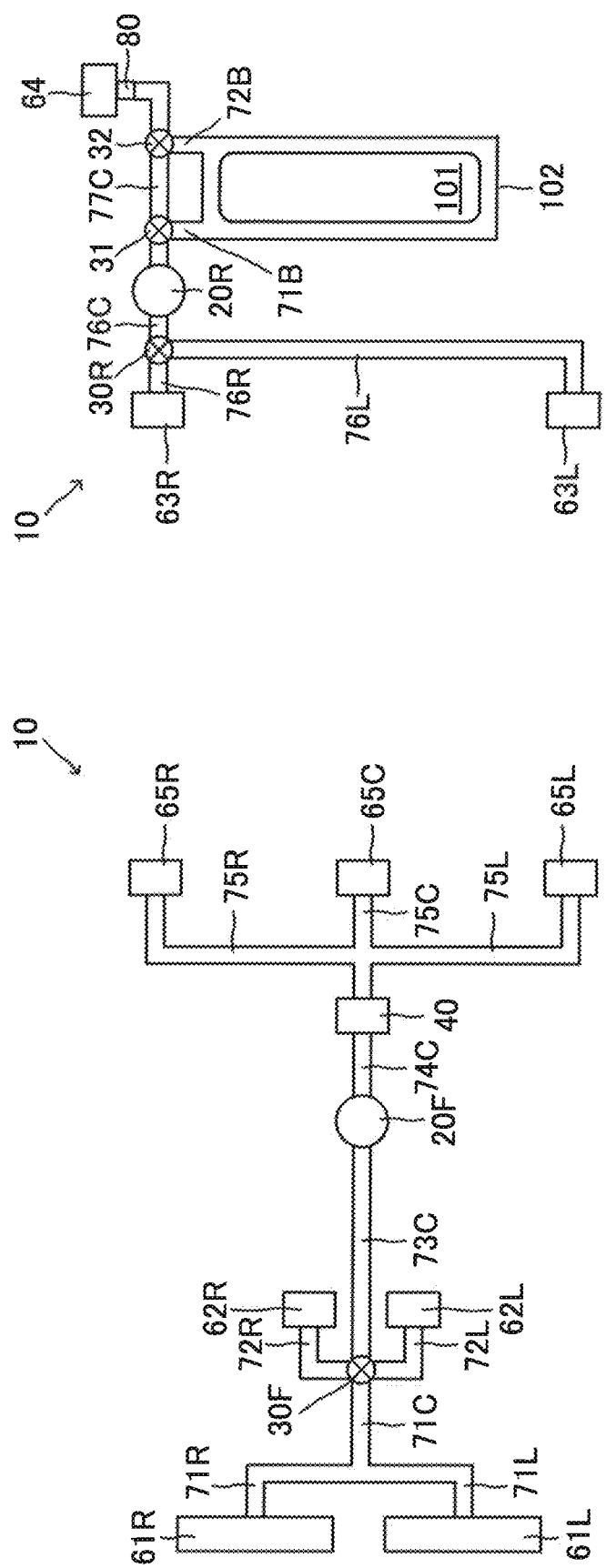
FIG. 12 is a general view which shows the vehicle air conditioning apparatus according to the second modified example.

The vehicle air conditioning apparatus 10 may be configured as described below. As shown in FIG. 11, the vehicle air conditioning apparatus 10 according to a second modified example of the embodiment of the invention further includes a first switching valve 31 and a second switching valve 32. In addition, as shown in FIG. 12, the vehicle air conditioning apparatus 10 according to the second modified example includes a first battery duct 71B and a second battery duct 72B.

The first switching valve 31 is provided on the common interior-air discharging duct 77C. The second switching valve 32 is provided on the common interior-air discharging duct 77C downstream of the first switching valve 31.

One end of the first battery duct 71B is fluidically connected to the first switching valve 31. The other end of the first battery duct 71B is fluidically connected to the battery case 102. One end of the second battery duct 72B is fluidically connected to the second switching valve 32. The other end of the second battery duct 72B is fluidically connected to the battery case 102.

As shown in FIG. 11, the first switching valve 31 is electrically connected to the ECU 90. The ECU 90 can control an operation position of the first switching valve 31. The second switching valve 32 is also electrically connected to the ECU 90. The ECU 90 can control an operation position of the second switching valve 32.

When the first switching valve 31 and the second switching valve 32 are set at normal positions, respectively, the air discharged from the rear blower 20R is discharged to the outside of the vehicle 100 from the interior-air discharging opening 64 via the common interior-air discharging duct 77C. On the other hand, when the first switching valve 31 and the second switching valve 32 are set at branching positions, respectively, the air discharged from the rear blower 20R is introduced into the battery case 102 via the common interior-air discharging duct 77C, the first switching valve 31, and the first battery duct 71B. In addition, in this case, the air in the battery case 102 is discharged to the outside of the vehicle 100 from the interior-air discharging opening 64 via the second battery duct 72B, the second switching valve 32, the common interior-air discharging duct 77C.

<Summary of Operations of Vehicle Air Conditioning Apparatus According to Second Modified Example>

The vehicle air conditioning apparatus 10 according to the second modified example determines whether (i) the battery temperature Tbat is lower than a target battery temperature Tbat_tgt, and (ii) the interior-air temperature Tin is higher than or equal to the battery temperature Tbat before the vehicle air conditioning apparatus 10 starts to execute the active outside-air circulation control. In other words, the vehicle air conditioning apparatus 10 determines whether (i) the battery 101 is requested to be warmed up, and (ii) the interior-air temperature Tin is higher than or equal to the battery temperature Tbat before the vehicle air conditioning apparatus 10 starts to execute the active outside-air circulation control.

When (i) the battery 101 is requested to be warmed up, and (ii) the interior-air temperature Tin is higher than or equal to the battery temperature Tbat, the vehicle air conditioning apparatus 10 sets the first switching valve 31 and the second switching valve 32 at the branching positions, respectively and executes the active outside-air circulation control.

Thereby, the air having a temperature higher than the battery temperature Tbat is supplied to the battery case 102 when the battery 101 is requested to be warmed up. Thus, the battery 101 can be warmed up promptly.

On the other hand, when (i) the battery 101 is requested to be warmed up, and (ii) the interior-air temperature Tin is lower than the battery temperature Tbat, the vehicle air conditioning apparatus 10 sets the first switching valve 31 and the second switching valve 32 at the normal positions, respectively and executes the active outside-air circulation control.

Thereby, the air having a temperature lower than the battery temperature Tbat is not supplied to the battery case 102 when the battery 101 is requested to be warmed up. Therefore, the battery 101 is not prevented from being warmed up. Thus, the battery 101 can be warmed up appropriately.

In addition, the vehicle air conditioning apparatus 10 determines whether (i) the battery temperature Tbat is higher than or equal to the target battery temperature Tbat_tgt, and (ii) the interior-air temperature Tin is lower than or equal to the battery temperature Tbat before the vehicle air conditioning apparatus 10 starts to execute the active outside-air circulation control. In other words, the vehicle air conditioning apparatus 10 determines whether (i) the battery 101 is requested to be cooled, and (ii) the interior-air temperature Tin is lower than or equal to the battery temperature Tbat before the vehicle air conditioning apparatus 10 starts to execute the active outside-air circulation control.

When (i) the battery 101 is requested to be cooled, and (ii) the interior-air temperature Tin is lower than or equal to the battery temperature Tbat, the vehicle air conditioning apparatus 10 sets the first switching valve 31 and the second switching valve 32 at the branching positions, respectively and executes the active outside-air circulation control.

Thereby, the air having a temperature lower than the battery temperature Tbat is supplied to the battery case 102 when the battery 101 is requested to be cooled. Thus, the battery 101 can be cooled promptly.

On the other hand, when (i) the battery 101 is requested to be cooled, and (ii) the interior-air temperature Tin is higher than the battery temperature Tbat, the vehicle air conditioning apparatus 10 sets the first switching valve 31 and the second switching valve 32 at the normal positions, respectively and executes the active outside-air circulation control.

Thereby, the air having a temperature higher than the battery temperature Tbat is not supplied to the battery case 102 when the battery 101 is requested to be cooled. Therefore, the battery 101 is not prevented from being cooled. Thus, the battery 101 can be cooled appropriately.

<Particular Operations of Vehicle Air Conditioning Apparatus According to Second Modified Example>

Next, particular operations of the vehicle air conditioning apparatus 10 according to the second modified example will be described. The CPU of the ECU 90 of the vehicle air conditioning apparatus 10 according to the second modified example is configured to or programmed to execute a routine shown in FIG. 13 and the routine shown in FIG. 6 each time the predetermined time Tcal elapses.

Figure 13:
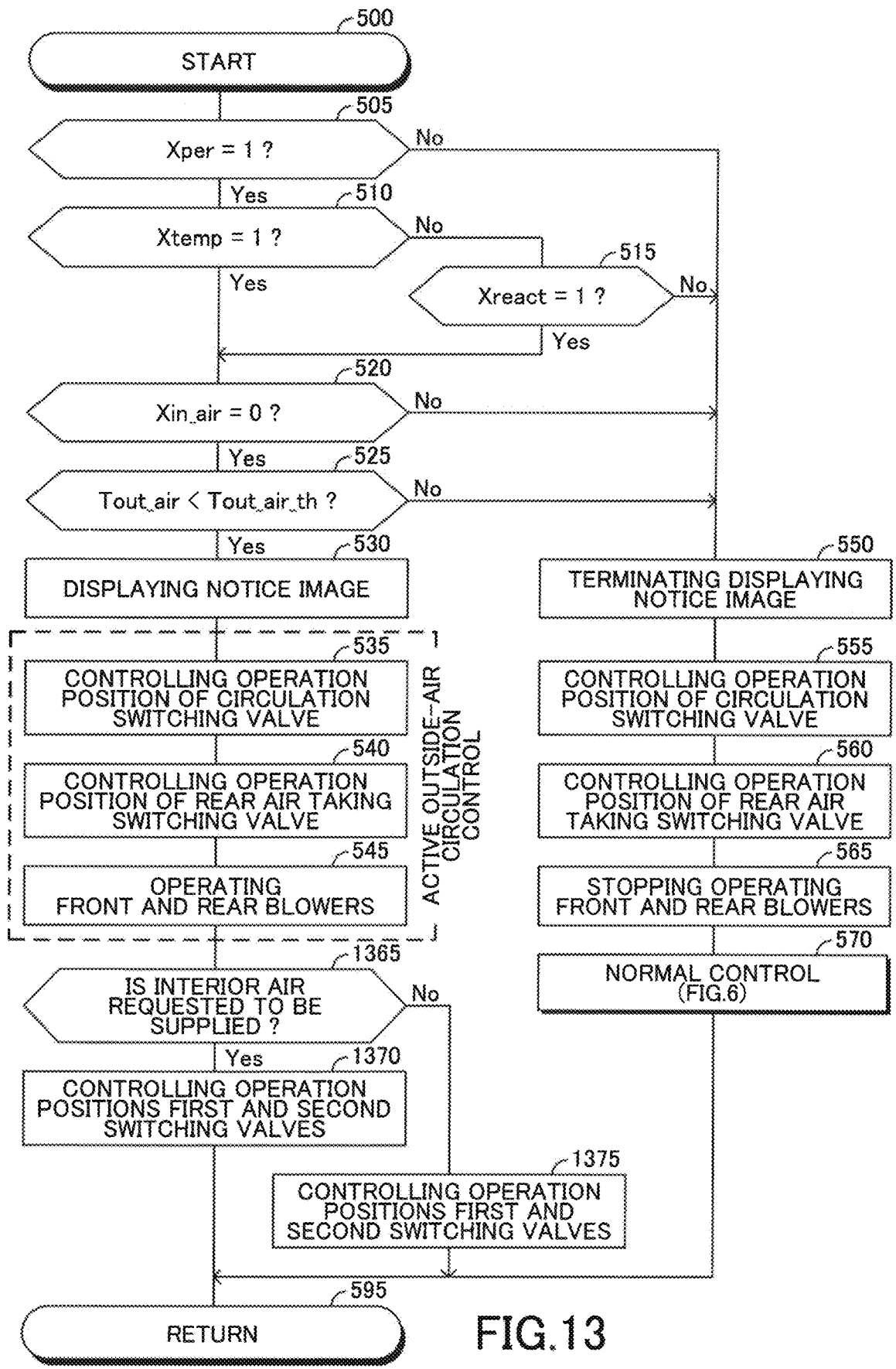
FIG. 13 is a view which shows a flowchart of a routine executed by the CPU of the ECU of the vehicle air conditioning apparatus according to the second modified example.

The routine shown in FIG. 13 is the same as the routine shown in FIG. 5 except that a step 1365, a step 1370, and a step 1375 are added. Therefore, after the CPU executes a step 545, the CPU proceeds with the process to the step 1365 to determine whether the air taken to the rear common interior-air taking duct 76C from the vehicle interior 105 is requested to be supplied to the battery case 102.

When the CPU determines "Yes" at the step 1365, the CPU proceeds with the process to the step 1370 to set the operation positions of the first switching valve 31 and the second switching valve 32 at the branching positions, respectively. Next, the CPU proceeds with the process to the step 595 to terminate this routine once.

On the other hand, when the CPU determines "No" at the step 1365, the CPU proceeds with the process to the step 1375 to set the operation positions of the first switching valve 31 and the second switching valve 32 at the normal positions, respectively. Next, the CPU proceeds with the process to the step 595 to terminate this routine once.

An example of the particular operations of the vehicle air conditioning apparatus 10 according to the second modified example has been described. Thereby, the battery 101 can be warmed promptly when the battery 101 is requested to be warmed up. On the other hand, when the battery 101 is requested to be cooled, the battery 101 can be cooled promptly.

Further, when at least one of the passengers has an infection, the air which may include the pathogens is prevented from contacting to the other passengers not infected. Thus, the other passengers not infected can be prevented from catching infections.

Third Modified Example

Figure 14:
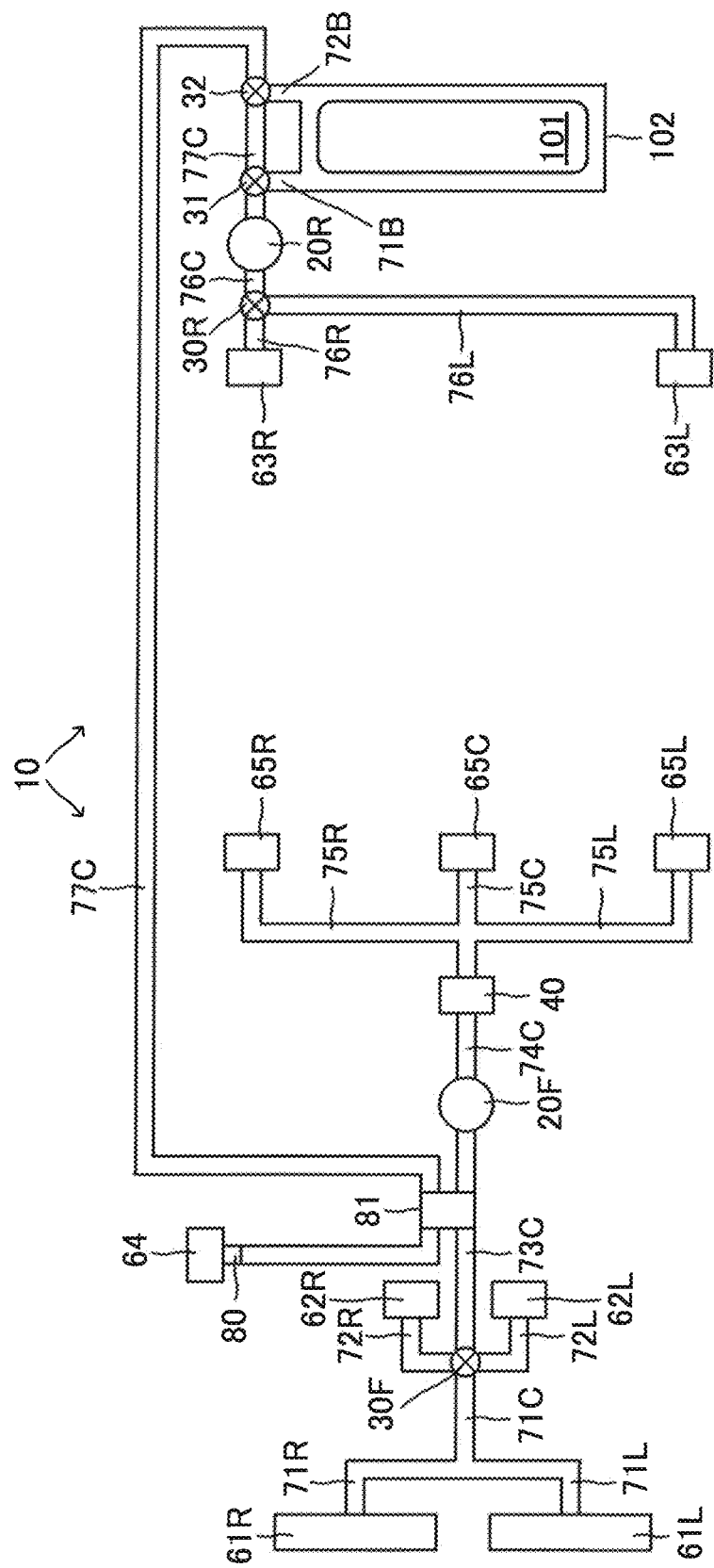
FIG. 14 is a general view which shows the vehicle air conditioning apparatus according to a third modified example of the embodiment of the invention.

The vehicle air conditioning apparatus 10 may be configured as described below. As shown in FIG. 14, the vehicle air conditioning apparatus 10 according to a third modified example of the embodiment of the invention further includes a heat exchanger 81. The heat exchanger 81 is provided in the common interior-air discharging duct 77C and the common air taking duct 73C to exchange heat between the air flowing in the common interior-air discharging duct 77C and the air flowing in the common air taking duct 73C.

<Operations of Vehicle Air Conditioning Apparatus According to Third Modified Example>

The vehicle air conditioning apparatus 10 according to the third modified example operates similar to the vehicle air conditioning apparatus 10 according to the second modified example.

When the vehicle interior 105 is being warmed up, the interior-air temperature Tin is higher than the outside-air temperature Tout. Therefore, when (i) the active outside-air circulation control or the normal outside-air circulation control is executed, and (ii) the air in the vehicle interior 105 is supplied to the heat exchanger 81 without flowing through the battery case 102, the outside air to be introduced into the vehicle interior 105 is heated by the air supplied to the heat exchanger 81 from the vehicle interior 105. Thus, an efficiency of heating the vehicle interior 105 is improved. Further, when the battery 101 is cooled by the air to be supplied to the heat exchanger 81 from the vehicle interior 105 via the battery case 102, the temperature of the air increases in the battery case 102. In this case, the outside air to be introduced into the vehicle interior 105 is heated by the air supplied to the heat exchanger 81 from the vehicle interior 105. Thus, the efficiency of heating the vehicle interior 105 is improved. On the other hand, when the battery 101 is warmed up by the air to be supplied to the heat exchanger 81 from the vehicle interior 105 via the battery case 102, the temperature of the air decreases in the battery case 102. Nevertheless, the temperature of the air decreased in the battery case 102 may be higher than the outside-air temperature Tout. In this case, the outside air to be introduced into the vehicle interior 105 is heated by the air supplied to the heat exchanger 81 from the vehicle interior 105. Thus, the efficiency of heating the vehicle interior 105 is improved.

On the other hand, when the vehicle interior 105 is being cooled, the interior-air temperature Tin is lower than the outside-air temperature Tout. Therefore, when (i) the active outside-air circulation control or the normal outside-air circulation control is executed, and (ii) the air in the vehicle interior 105 is supplied to the heat exchanger 81 without flowing through the battery case 102, the outside air to be introduced into the vehicle interior 105 is cooled by the air supplied to the heat exchanger 81 from the vehicle interior 105. Thus, an efficiency of cooling the vehicle interior 105 is improved. Further, when the battery 101 is warmed up by the air to be supplied to the heat exchanger 81 from the vehicle interior 105 via the battery case 102, the temperature of the air decreases in the battery case 102. In this case, the outside air to be introduced into the vehicle interior 105 is cooled by the air supplied to the heat exchanger 81 from the vehicle interior 105. Thus, the efficiency of cooling the vehicle interior 105 is improved. On the other hand, when the battery 101 is cooled by the air to be supplied to the heat exchanger 81 from the vehicle interior 105 via the battery case 102, the temperature of the air increases in the battery case 102. Nevertheless, the temperature of the air increased in the battery case 102 may be lower than the outside-air temperature Tout. In this case, the outside air to be introduced into the vehicle interior 105 is cooled by the air supplied to the heat exchanger 81 from the vehicle interior 105. Thus, the efficiency of cooling the vehicle interior 105 is improved.

It should be noted that the vehicle air conditioning apparatus 10 according to the third modified example may be configured to determine whether or not to supply the air to the heat exchanger 81 from the vehicle interior 105 via the battery case 102 when the vehicle air conditioning apparatus 10 executes the active outside-air circulation control or the normal outside-air circulation control, depending on a relationship between (i) the interior-air temperature Tin, (ii) the outside-air temperature Tout, and (iii) the battery temperature Tbat to improve the efficiency of heating the vehicle interior 105 and the efficiency of cooling the vehicle interior 105 with certainty.

For example, the vehicle air conditioning apparatus 10 is configured to supply the air to the heat exchanger 81 from the vehicle interior 105 via the battery case 102 when (i) the vehicle air conditioning apparatus 10 executes warming up the vehicle interior 105, (ii) the battery 101 is requested to be warmed up, (iii) a first condition described below is satisfied, and (iv) a second condition described below is satisfied. It should be noted that the interior-air temperature Tin is higher than the outside-air temperature Tout when the vehicle air conditioning apparatus 10 executes warming up the vehicle interior 105.

The first condition is a condition that a difference dTbat between the interior-air temperature Tin and the battery temperature Tbat is smaller than a predetermined threshold dTth_1. The second condition is a condition that a difference dTout between the interior-air temperature Tin and the outside-air temperature Tout is larger than a predetermined threshold dTth_2.

In this case, the temperature of the air supplied to the battery case 102 from the vehicle interior 105 decreases in the battery case 102 to a small extent. In addition, the temperature of the air decreased in the battery case 102 is sufficiently higher than the outside-air temperature Tout. Therefore, the outside air to be introduced in to the vehicle interior 105 can be heated in the heat exchanger 81 by the air having the temperature decreased in the battery case 102. Thus, the efficiency of heating the vehicle interior 105 can be improved.

On the other hand, the vehicle air conditioning apparatus 10 is configured to supply the air to the heat exchanger 81 from the vehicle interior 105 without flowing through the battery case 102 when at least one of the first condition and the second condition is not satisfied. Thereby, the temperature of the air can be prevented from being decreased in the battery case 102. Therefore, the outside air to be introduced into the vehicle interior 105 can be heated in the heat exchanger 81 by the air supplied to the heat exchanger 81. Thus, the efficiency of heating the vehicle interior 105 can be improved.

Further, the vehicle air conditioning apparatus 10 is configured to supply the air to the heat exchanger 81 from the vehicle interior 105 via the battery case 102, independently of (i) the difference dTbat between the interior-air temperature Tin and the battery temperature Tbat and (ii) the difference dTout between the interior-air temperature Tin and the outside-air temperature Tout when (i) the vehicle air conditioning apparatus 10 executes heating the vehicle interior 105, and (ii) the battery 101 is requested to be cooled. In this case, the temperature of the air introduced into the battery case 102 from the vehicle interior 105 is increased in the battery case 102. Therefore, the outside air to be introduced into the vehicle interior 105 can be heated in the heat exchanger 81 by the air having the temperature increased in the battery case 102. Thus, the efficiency of heating the vehicle interior 105 can be improved.

On the other hand, the vehicle air conditioning apparatus 10 is configured to supply the air to the heat exchanger 81 from the vehicle interior 105 via the battery case 102 when (i) the vehicle air conditioning apparatus 10 executes cooling the vehicle interior 105, (ii) the battery 101 is requested to be cooled, (iii) a third condition described below is satisfied, and (iv) a fourth condition described below is satisfied. In general, the battery temperature Tbat is higher than the outside-air temperature Tout. Thus, the interior-air temperature Tin is lower than the battery temperature Tbat when the battery 101 is being cooled by the vehicle air conditioning apparatus 10. Further, the interior-air temperature Tin is lower than the interior-air temperature Tin when the vehicle interior 105 is being cooled by the vehicle air conditioning apparatus 10.

The third condition is a condition that the difference dTbat between the interior-air temperature Tin and the battery temperature Tbat is smaller than a predetermined threshold dTth_3. The fourth condition is a condition that the difference dTout between the interior-air temperature Tin and the outside-air temperature Tout is larger than a predetermined threshold dTth_4.

In this case, if the temperature of the air supplied to the battery case 102 from the vehicle interior 105 is increased in the battery case 102, the temperature of the air is increased to a small extent. Further, the temperature of the air increased in the battery case 102 is sufficiently lower than the outside-air temperature Tout. Therefore, the outside air to be introduced to the vehicle interior 105 can be cooled in the heat exchanger 81 by the air having the temperature increased in the battery case 102. Thus, the efficiency of cooling the vehicle interior 105 can be improved.

On the other hand, the vehicle air conditioning apparatus 10 is configured to supply the air to the heat exchanger 81 from the vehicle interior 105 without flowing through the battery case 102 when at least one of the third condition and the fourth condition is not satisfied. Thereby, the temperature of the air to be supplied to the heat exchanger 81 from the vehicle interior 105 is not increased in the battery case 102. Therefore, the outside air to be introduced into the vehicle interior 105 can be cooled in the heat exchanger 81 by the air supplied to the heat exchanger 81 from the vehicle interior 105. Thus, the efficiency of cooling the vehicle interior 105 can be improved.

Further, the vehicle air conditioning apparatus 10 is configured to supply the air to the heat exchanger 81 from the vehicle interior 105 via the battery case 102, independently of (i) the difference dTbat between the interior-air temperature Tin and the battery temperature Tbat and (ii) the difference dTout between the interior-air temperature Tin and the outside-air temperature Tout when (i) the vehicle air conditioning apparatus 10 executes cooling the vehicle interior 105, and (ii) the battery 101 is requested to be warmed up. In this case, the temperature of the air introduced into the battery case 102 from the vehicle interior 105 decreases in the battery case 102. Therefore, the outside air to be introduced into the vehicle interior 105 can be cooled in the heat exchanger 81 by the air having the temperature decreased in the battery case 102. Thus, the efficiency of cooling the vehicle interior 105 can be improved.

It should be noted that the present invention is not limited to the aforementioned embodiment and various modifications can be employed within the scope of the present invention.

What is claimed is:

1. A vehicle air conditioning apparatus, comprising:
    at least one physical condition information sensor which detects information on physical conditions of passengers in a vehicle as physical condition information; and
    an electronic control unit configured to selectively execute (i) an outside-air circulation control for discharging air from an interior of the vehicle to outside of the vehicle and introducing outside air to the interior of the vehicle from the outside of the vehicle and (ii) an interior-air circulation control for taking the air from the interior of the vehicle and returning the taken air to the interior of the vehicle,
    wherein the electronic control unit executes the outside-air circulation control when the electronic control unit determines that at least one of the passengers has an infection, based on the physical condition information,
    the vehicle is installed with a battery; and
    the electronic control unit is configured to execute the outside-air circulation control to (i) supply the air taken from the interior of the vehicle to the battery and (ii) discharge the air supplied to the battery to the outside of the vehicle when (i) the battery is requested to be warmed up, and (ii) a temperature of the air in the interior of the vehicle is higher than a temperature of the battery.

2. The vehicle air conditioning apparatus as set forth in claim 1, wherein:
    the vehicle air conditioning apparatus further comprises taking openings for taking the air from the interior of the vehicle; and
    when the electronic control unit determines that at least one of the passengers has an infection, the electronic control unit executes the outside-air circulation control to (i) take the air from the interior of the vehicle via one or more of the taking openings provided nearest the infected passenger and (ii) discharge the taken air to the outside of the vehicle.

3. The vehicle air conditioning apparatus as set forth in claim 1, wherein:
    the at least one physical condition information sensor includes at least one temperature sensor which detects skin temperatures of the passengers as passenger skin temperatures; and
    the electronic control unit determines that the passenger having a body temperature higher than or equal to a predetermined body temperature is an infected passenger, based on the passenger skin temperatures detected by the at least one temperature sensor.

4. The vehicle air conditioning apparatus as set forth in claim 1, wherein:
    the at least one physical condition information sensor includes at least one camera which takes images of the passengers; and
    the electronic control unit determines that the passenger making predetermined biological reaction is an infected passenger, based on the images of the passengers taken by the at least one camera.

5. The vehicle air conditioning apparatus as set forth in claim 1, wherein:
the at least one physical condition information sensor includes at least one microphone which detects sound in the interior of the vehicle; and
the electronic control unit determines that the passenger making predetermined biological reaction is an infected passenger, based on the sound detected by the at least one microphone.

6. A vehicle air conditioning apparatus, comprising:
at least one physical condition information sensor which detects information on physical conditions of passengers in a vehicle as physical condition information; and
an electronic control unit configured to selectively execute (i) an outside-air circulation control for discharging air from an interior of the vehicle to outside of the vehicle and introducing outside air to the interior of the vehicle from the outside of the vehicle and (ii) an interior-air circulation control for taking the air from the interior of the vehicle and returning the taken air to the interior of the vehicle,
wherein the electronic control unit executes the outside-air circulation control when the electronic control unit determines that at least one of the passengers has an infection, based on the physical condition information, wherein:
the vehicle is installed with a battery; and
the electronic control unit is configured to execute the outside-air circulation control to (i) supply the air taken from the interior of the vehicle to the battery and (ii) discharge the air supplied to the battery to the outside of the vehicle when (i) the battery is requested to be cooled, and (ii) a temperature of the air in the interior of the vehicle is lower than a temperature of the battery.

7. A vehicle air conditioning apparatus, comprising:
at least one physical condition information sensor which detects information on physical conditions of passengers in a vehicle as physical condition information; and
an electronic control unit configured to selectively execute (i) an outside-air circulation control for discharging air from an interior of the vehicle to outside of the vehicle and introducing outside air to the interior of the vehicle from the outside of the vehicle and (ii) an interior-air circulation control for taking the air from the interior of the vehicle and returning the taken air to the interior of the vehicle,
wherein the electronic control unit executes the outside-air circulation control when the electronic control unit determines that at least one of the passengers has an infection, based on the physical condition information, wherein the vehicle air conditioning apparatus further comprises:
a heating apparatus which heats the outside air to be introduced into the interior of the vehicle from the outside of the vehicle by the outside-air circulation control; and
a heat exchanger which is provided upstream of the heating apparatus and exchanges heat between (i) the air to be discharged to the outside of the vehicle from the interior of the vehicle by the outside-air circulation control and (ii) the air to be introduced into the interior of the vehicle from the outside of the vehicle by the outside-air circulation control.

8. The vehicle air conditioning apparatus as set forth in claim 7, wherein:
the vehicle air conditioning apparatus further comprises a temperature setting dial which sets a target of a temperature of the interior of the vehicle; and
the electronic control unit executes the outside-air circulation control with controlling operations of the heating apparatus to introduce the outside air having a temperature corresponding to the target set by the temperature setting dial, to the interior of the vehicle.

9. A vehicle air conditioning apparatus, comprising:
at least one physical condition information sensor which detects information on physical conditions of passengers in a vehicle as physical condition information; and
an electronic control unit configured to selectively execute (i) an outside-air circulation control for discharging air from an interior of the vehicle to outside of the vehicle and introducing outside air to the interior of the vehicle from the outside of the vehicle and (ii) an interior-air circulation control for taking the air from the interior of the vehicle and returning the taken air to the interior of the vehicle,
wherein the electronic control unit executes the outside-air circulation control when the electronic control unit determines that at least one of the passengers has an infection, based on the physical condition information, wherein the vehicle air conditioning apparatus further comprises:
a cooling apparatus which cools the outside air to be introduced into the interior of the vehicle from the outside of the vehicle by the outside-air circulation control; and
a heat exchanger which is provided upstream of the cooling apparatus and exchanges heat between (i) the air to be discharged to the outside of the vehicle from the interior of the vehicle by the outside-air circulation control and (ii) the air to be introduced into the interior of the vehicle from the outside of the vehicle by the outside-air circulation control.

10. The vehicle air conditioning apparatus as set forth in claim 9, wherein:
the vehicle air conditioning apparatus further comprises a temperature setting dial which sets a target of a temperature of the interior of the vehicle; and
the electronic control unit executes the outside-air circulation control with controlling operations of the cooling apparatus to introduce the outside air having a temperature corresponding to the target set by the temperature setting dial, to the interior of the vehicle.

11. A vehicle air conditioning apparatus, comprising:
at least one physical condition information sensor which detects information on physical conditions of passengers in a vehicle as physical condition information; and
an electronic control unit configured to selectively execute (i) an outside-air circulation control for discharging air from an interior of the vehicle to outside of the vehicle and introducing outside air to the interior of the vehicle from the outside of the vehicle and (ii) an interior-air circulation control for taking the air from the interior of the vehicle and returning the taken air to the interior of the vehicle,
wherein the electronic control unit executes the outside-air circulation control when the electronic control unit determines that at least one of the passengers has an infection, based on the physical condition information, wherein the electronic control unit is configured to execute the interior-air circulation control without executing the outside-air circulation control in response to the passenger requesting to execute the interior-air circulation control even when the electronic control unit determines that at least one of the passengers has an infection.

12. The vehicle air conditioning apparatus as set forth in claim 1, wherein the electronic control unit is configured to notice the passengers that the outside-air circulation control is executed when the electronic control unit executes the outside-air circulation control in response to determining that at least one of the passengers has an infection.

13. The vehicle air conditioning apparatus as set forth in claim 12, wherein the vehicle air conditioning apparatus further comprises a display device which displays an image noticing that the outside-air circulation control is executed.

14. The vehicle air conditioning apparatus as set forth in claim 1, wherein a driver of the vehicle is one of the passengers.

\* \* \* \* \*